US009965696B2

(12) United States Patent
Alves

(10) Patent No.: US 9,965,696 B2
(45) Date of Patent: May 8, 2018

(54) DIGITAL CAMERA CONTROL SYSTEM

(71) Applicant: James Alves, San Diego, CA (US)

(72) Inventor: James Alves, San Diego, CA (US)

( * ) Notice: Subject to any disclaimer, the term of this patent is extended or adjusted under 35 U.S.C. 154(b) by 370 days.

(21) Appl. No.: 14/986,575

(22) Filed: Dec. 31, 2015

(65) Prior Publication Data

US 2017/0195605 A1    Jul. 6, 2017

(51) Int. Cl.
*H04N 5/376* (2011.01)
*G06K 9/46* (2006.01)
*G06K 9/32* (2006.01)
*H04N 5/232* (2006.01)
(Continued)

(52) U.S. Cl.
CPC ......... *G06K 9/4661* (2013.01); *G06K 9/3258* (2013.01); *H04N 5/2327* (2013.01); *H04N 5/2351* (2013.01); *H04N 5/2353* (2013.01); *H04N 5/2354* (2013.01); *H04N 5/23254* (2013.01); *H04N 5/243* (2013.01)

(58) Field of Classification Search
CPC ............... G06K 9/3258; G06K 9/4661; H04N 5/23254; H04N 5/2327; H04N 5/2351; H04N 5/2353; H04N 5/2354; H04N 5/243

See application file for complete search history.

(56) References Cited

U.S. PATENT DOCUMENTS 4,470,067 A    9/1984  Mino
5,086,314 A    2/1992  Aoki et al.
5,258,805 A    11/1993  Aoki et al.
(Continued)

FOREIGN PATENT DOCUMENTS

WO    PCT/US2008/068719    7/2008

OTHER PUBLICATIONS

Liu, Xinqiao, CMOS Image Sensors Dynamic Range and SNR Enhancement via Statistical Signal Processing, Department of Electrical Engineering, Stanford University, Palo Alto, CA, Jun. 2002.
(Continued)

*Primary Examiner* — Amy Hsu
(74) *Attorney, Agent, or Firm* — Mark Wisnosky

(57) ABSTRACT

A digital camera control system that requires no light sensors is described. The control system relies on modeled external environmental geophysical solar parameters, geometric relationships between the object to be imaged and surrounding potentially shadowing objects, the material properties of the object to be imaged such as reflectivity are combined to produce the estimated irradiance on a camera sensor for the particular time of day, date and geometric relationship between the object and the sun. The calculated irradiance on the image sensor for the background of the object of interest and a feature to be recognized provide a contrast. The signal to noise requirements for the feature recognition are used to determine a minimum required contrast transfer function for the sensor. Control parameters for the sensor are then determined to meet the minimum contrast requirements. The system therefore provides a method to rapidly determine an optimum camera settings for any time of day and ensures the camera is always ready to capture at least the minimum required contrast image of a fast moving transient object. The system is demonstrated for use in a license plate imaging application.

27 Claims, 27 Drawing Sheets

(51) Int. Cl.
*H04N 5/235* (2006.01)
*H04N 5/243* (2006.01)

(56) References Cited

U.S. PATENT DOCUMENTS

| | | | |
|---|---|---|---|
| 5,266,983 A | 11/1993 | Takagi | |
| 5,335,072 A * | 8/1994 | Tanaka | G06F 17/30265 |
| | | | 348/231.3 |
| 5,365,290 A | 11/1994 | Suzuki et al. | |
| 5,432,571 A | 7/1995 | Aoki et al. | |
| 5,483,329 A | 1/1996 | Aoki et al. | |
| 5,606,391 A | 2/1997 | Aoki et al. | |
| 5,742,340 A | 4/1998 | Alves | |
| 5,809,161 A | 9/1998 | Auty et al. | |
| 5,963,253 A | 10/1999 | Dwyer | |
| 6,553,131 B1 | 4/2003 | Neubauer et al. | |
| 6,618,080 B1 | 9/2003 | Igarashi | |
| 6,747,687 B1 | 6/2004 | Alves | |
| 7,336,309 B2 | 2/2008 | Stark | |
| 7,339,495 B2 | 3/2008 | Kavner | |
| 7,609,303 B1 * | 10/2009 | Lee | H04N 5/3575 |
| | | | 348/241 |
| 8,265,988 B2 | 9/2012 | Hedley et al. | |
| 8,775,236 B2 | 7/2014 | Hedley et al. | |
| 2001/0005225 A1 * | 6/2001 | Clark | H04N 5/3454 |
| | | | 348/302 |
| 2002/0122126 A1 * | 9/2002 | Lenz | H04N 3/155 |
| | | | 348/297 |
| 2003/0151686 A1 * | 8/2003 | Koyama | H04N 5/367 |
| | | | 348/304 |
| 2003/0174865 A1 | 9/2003 | Vernon | |
| 2005/0197976 A1 | 9/2005 | Tuton et al. | |
| 2006/0164533 A1 * | 7/2006 | Hsieh | H01L 27/14632 |
| | | | 348/317 |
| 2006/0269105 A1 | 11/2006 | Langlinais | |
| 2007/0195183 A1 | 8/2007 | Ovsiannikov et al. | |
| 2007/0268396 A1 * | 11/2007 | Kurane | H04N 5/2353 |
| | | | 348/362 |
| 2011/0288909 A1 | 11/2011 | Hedley et al. | |
| 2015/0281557 A1 * | 10/2015 | Hirosawa | H04N 5/2258 |
| | | | 348/208.12 |
| 2015/0319369 A1 * | 11/2015 | Serrano Gotarredona | |
| | | | H04N 5/243 |
| | | | 250/208.1 |

OTHER PUBLICATIONS

GevicCam, GigE Vision Camera GF-Series, Data Sheet.
Melexis, AutoBrite(R) Imaging Technology: Wide Dynamic Range for Automotive Machine Vision, White Paper.

* cited by examiner

DIGITAL CAMERA CONTROL SYSTEM

BACKGROUND OF THE INVENTION

Technical Field

The present invention relates to a control system to optimize imaging parameters of a digital video camera.

Related Background Art

High-speed digital cameras have become commonly used in toll collection and traffic law enforcement applications. These cameras must acquire images of fast moving objects with an image quality sufficient to identify the object(s) of interest. In the case of vehicles on a motorway, the objective is often to be able to identify the vehicle by clearly imaging the vehicle's license plate. Typically both the plate's alpha-numerics and the state name must be legible in the image. The larger alpha-numerics are often, but not always, in block print in a uniform color on a uniform or nearly uniform background. The state names however are often much smaller font sizes and printed in different colors and in various scripts. Generally modern license plates are designed more for aesthetics rather than to maximize legibility especially on those plates sporting multi-colored and/or scenic backgrounds. In order to recognize characters, a camera system must provide sufficient contrast between the lettering and the background. White license plates illuminated by direct sunlight (or strong reflections of nighttime lighting) generally yield sufficient video image contrast to easily recognize characters, however the illumination onto and therefore the radiance from such plates may easily be so high as to saturate the camera's sensor. In these cases the gain of the camera needs to be low enough to prevent image saturation. However portions of license plates that are in shadows (or during low nighttime illumination conditions) often lack enough video image contrast to support character recognition. In these cases the gain of the camera needs to be increased to create the required contrast for plate legibility. Imaging license plates therefore requires a means to allocate the dynamic range of the imaging sensor to simultaneously address both low light levels requiring increased gain and high light levels requiring decreased gain. To capture and make the video image of license plate characters and State name information legible requires high spatial resolution, a field of view (or multiple cameras) to observe at least one lane width, sufficient grey-scale/color contrast resolution to separate characters and State names from their background colors and sufficient dynamic range to prevent saturating the image whether the plate is in direct sunlight, in shadow, or under artificial illumination.

Recent advances in video camera technology have resulted in high spatial resolution sensors where pixels do not suffer from blooming or smearing problems (both of which can reduce or eliminate alpha-numeric contrast), have low noise so that small differences in alpha-numeric to local background contrasts can be resolved, and have gains that can vary across the array depending on the amount of light received (this feature supports imaging wide dynamic ranges without saturating). In order to provide sufficient contrast between characters and background of a license plate, a control system must set gain/exposure settings to make full use of the range of capabilities provided by these new sensors. The requirements to produce legible images are different in a high light situation versus a low light setting. For example, if a portion of a license plate is in shadow a high gain is needed to ensure good alpha-numeric to background contrast, whereas for a portion of a license plate in direct sunlight there is a naturally high contrast so that the gain can be lowered to prevent saturation of the image sensor and analog to digital electronics. A control system must be employed to make these tradeoffs.

The conditions under which the picture must be taken are also constantly changing. On short time scales the lighting during the daylight hours can change due to cloud cover and shadowing caused by other vehicles or even the vehicle that is being imaged. For typical traffic imaging applications the cameras are typically operational night and day and through all seasons of the year. The lighting conditions change as the angle of the sun changes relative to the plate surface during the course of a day and more slowly over the course of seasons. At night there is often artificial illumination provided to image the vehicle and its plate. Fixed exposure settings will not provide the image quality and brightness and contrast required to read the plate information.

For vehicles traveling at freeway speeds, the camera has only a fraction of a second to capture an image. License plates on vehicles may pass through the camera's field of view in ¼ second so there is little time for making camera gain controls during the time the vehicle's license plate is in the camera's field of view. In addition the first portion of the vehicle to appear in the camera's field of view may not be indicative of the irradiance levels seen at the end of the vehicle so first adjustments may not be best. Ideally the camera should be adjusted to take a good image of the vehicle and its license plate prior to both of them appearing in the camera's field of view.

Prior art gain control systems have relied upon using an external sensor to measure plate lighting conditions and define exposure settings. Other systems monitor the pixel values inside a portion of the camera's field of view to determine how to control camera gain. Both of these systems have drawbacks. External sensors add cost and complexity to the system and are often difficult to install in the optimum location to perform their light measurement function. Systems that use pixel value measurements for camera control suffer from time lags between when the light measurements are made versus when the camera gain control changes take affect and the relatively slow sampling rates of the pixel data relative to rapidly moving vehicles. In addition, the uncertainty of which pixel values correspond to actual license plate light levels (rather than the myriad of other radiance levels that can appear in the scene) means that the control input has a high uncertainty. Because of these issues, pixel value based control systems typically take several images in rapid succession at various gain settings to try to ensure that at least one results in a good image of the license plate. This may be difficult or impossible to achieve if the vehicle is moving at high speed and adds to the storage requirements of the system since multiple images must be saved until a determination as to which image is best for plate legibility.

There is a need for a control system for digital cameras that does not require light sensors (either internally using camera pixel values or externally using an auxiliary sensor) and yet the camera exposure controls are continuously adapted to ensure that a recognizable image of a vehicle and its license plate can be captured at the precise moment that the top and bottom of the vehicle and its license plate appear well framed within the camera's field of view. There is a need for a control system that does not suffer from any appreciable delays in setting proper camera controls or result in any significant delays in initiating a full frame image capture relative to the fastest expected rate of license plate movement through the camera's field of view. There is a need for a control system that ensures readability of both the numbers on the plates and the lettering that identifies the state of registration of the plate. There is a need for a system that can account for changing lighting conditions both on a short time scale (such as sudden cloud coverage of direct sunlight) and on long, even seasonal, time scales. There is a need for a system that can optimally take advantage of the full response range of the sensor. There is a need for a system that will provide sufficient contrast to read numbers, letters and otherwise identify an object in all conditions from low light levels where the object is shadowed to high light levels.

DISCLOSURE OF THE INVENTION

A camera control system is described that meets the demanding needs of high speed traffic and other imaging applications. The system relies upon environmental, geographic, illumination and electronic sensor response models that provide optimized settings for a given geographic location, camera direction relative to a subject, time of day, time of year and wide range of weather conditions. The subject of the image includes a background and a feature on the background that is to be detected and characterized. In one embodiment the subject is a license plate on a vehicle and the feature to be detected and characterized is text on the license plate. In another embodiment the minimum contrast required to recognize the feature on the background is further used to set the exposure parameters. The model uses environmental parameters coupled with a detailed illumination models to preset the camera for the conditions at the particular time, location and orientation that the imaging occurs. Through the use of models and known environmental factors the controller is able to set optimized image sensor parameters a priori. There is no need to continuously take images to sense the possible range of vehicle and plate radiance levels or read radiance levels from an external light sensor. The camera is always ready for the particular camera location, direction, environmental factors and particular lighting conditions.

The control system includes a sun direction calculation to determine the azimuth and elevation of the sun with respect to the object being imaged for any time of day and any time of year. Once the direction of the sun with respect to the object and the camera system is known, a solar irradiance model determines the light hitting the object directly. Lighting of the object during daytime comes not just from direct solar light but also from reflected light. Solar light is scattered by the atmosphere, reflected off the earth and back again from the atmosphere thereby increasing the total illumination. Additionally light is reflected off road surfaces. The models further include shadowing of the object by nearby stationary objects as well as potential shadowing by the vehicles' structure itself. The sum of the models provides an estimate of the total irradiance potentially available to the object. The models further include an accounting of the change in object irradiance caused by the tilt of the object with respect to the sources of illumination. In the case of a license plate, the tilt is assumed to be a nearly vertical surface oriented along the direction of traffic flow. Once the lighting of the object is known then the reflective response is modeled. Based upon material and geometric properties of the object the amount of light reflected from background and feature regions of the plate can be estimated. An optical imaging model then is used to calculate the light irradiance that would be imaged upon a sensor at the image plane of the camera. The relative geometric arrangement of the optics, sensor, object and various sources of illumination are accounted for to provide a calculated peak possible and lowest expected irradiance onto the sensor plane. Again this calculation is completed for the particular current time of day and season of the year. Since it takes a minute or more for any apparent solar movement in the sky, appropriate irradiance estimates can be developed well in advance of the appearance of any vehicle inside the camera's field of view. Thus new camera exposure control parameters can be established well in advance and applied quickly to the real time imaging problem. The optical model for irradiance onto the sensor is then mated with a response model for the camera image generation process. The response of each pixel in the image can be adequately modeled as an offset plus a proportionality constant times the product of the magnitude of the irradiance illuminating it, an integration time, and an electronics gain. The offset and proportionality constant are camera specific values that are measured during a calibration step prior to the camera being installed and utilized by the control algorithm to predict image values based on the predicted irradiance values onto the sensor.

The control algorithm uses the predicted sensor irradiance values to establish the image acquisition settings for the sensor to prevent saturation of the pixels that could correspond to license plate objects and to create an acceptable level of plate information contrast to ensure legibility. The settings are changed during the day to account for changing lighting conditions as the sun advances across the sky. In the preferred embodiment the image sensor is an active pixel sensor (APS) that enables a plurality of reset times and reset voltages during the integration time of acquiring an image. The settings include integration times, pixel charge accumulation reset levels, and the particular times that these reset level should occur during the image acquisition integration cycle. This invention describes embodiments that include a single reset time and level which results in a dual-slope pixel response to incoming irradiance levels as well as multiple reset times and levels. A dual-slope implementation results in a higher gain for plate objects acquired under low lighting conditions and a lower gain for plate objects acquired above some light level set by the selection of the pixel reset level and reset time. The invention results in an imaging system that anticipates and corrects for changing lighting conditions without the need for external sensors and/or taking multiple images at different gain settings per license plate passage. The resulting imaging system is faster responding, provides lower cost, lowers image storage requirements, and is more reliable than prior art in that it anticipates illumination settings prior to the actual image acquisition step and it eliminates extraneous components such as external image sensors.

One embodiment is a control system for a digital camera. The control system is programmed to implement the models enumerated above and set the exposure controls of the camera. The camera includes the ability to reset the accumulated charge (or voltage) at individual pixel locations during the exposure or image acquisition period.

Another embodiment is a method of controlling a camera system that includes the ability to calculate the exposure settings using the enumerated models. The computing capabilities may be either inherent to the camera system or external to and connected to the camera system.

In the following discussion the imaging of vehicle license plate tags is used for exemplary purposes to illustrate the invention. Application to other image acquisition problems would be apparent to those skilled in the art and are intended to be included within the scope of the invention.

DETAILED DESCRIPTION

The present invention is a set of models and algorithms for estimating irradiance of an object to be imaged as a function of environmental factors, the resulting radiance of the object and irradiance upon an imaging sensor and control algorithms for the sensor based upon the environmental factors and particular imaging requirements. In the exemplary case the requirements are contrast sufficient to recognize characters upon a vehicle license plate tag. The license plate features of interest are the background of the licenses plate, white being the brightest possible plate background, the numeric characters of the plate typically larger and black and the state or country designation lettering. The imaging requirements are to have sufficient contrast between the license plate background and the numeric character and the state designation characters.

Figure 1:
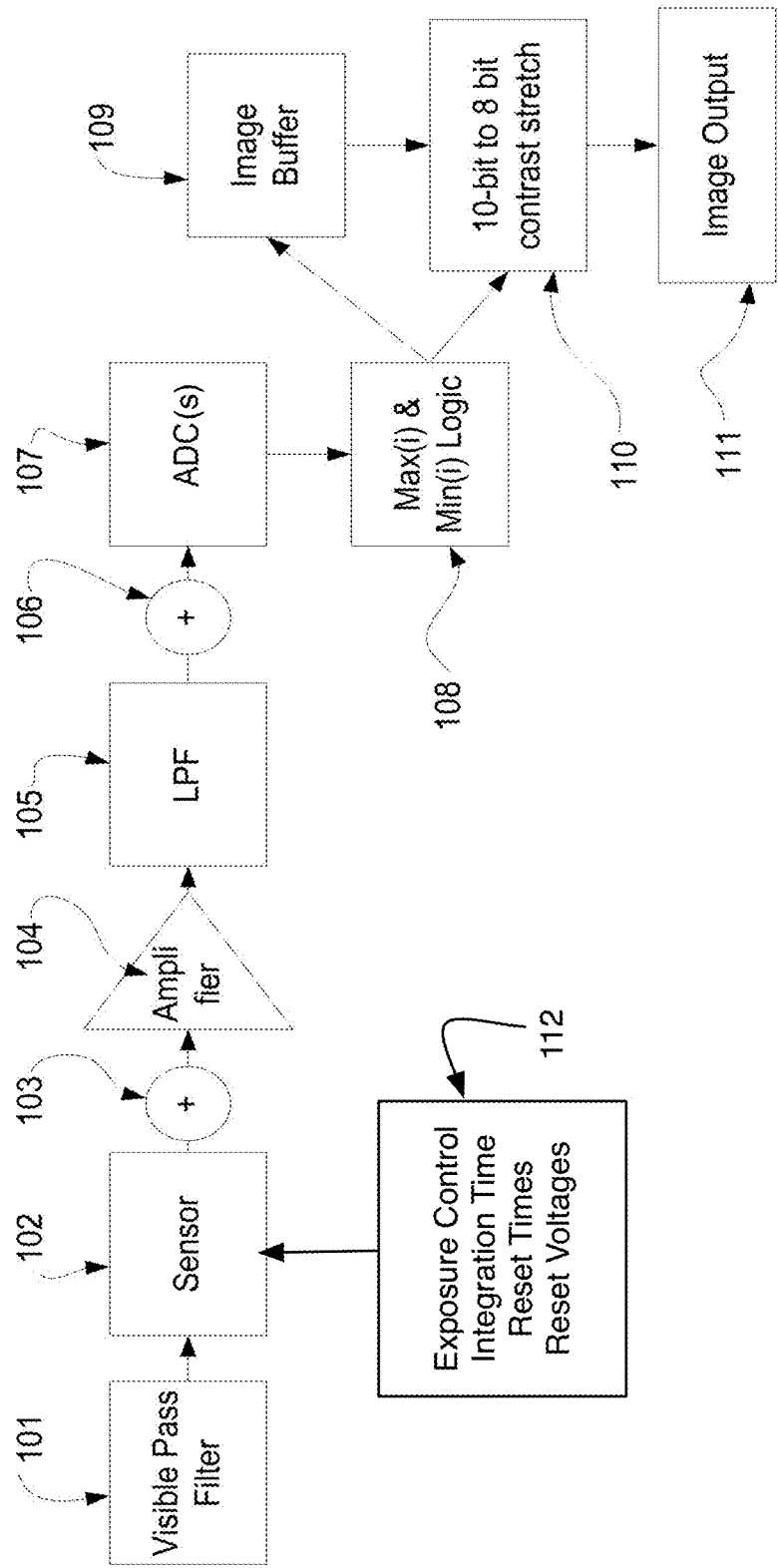
FIG. 1 is a block diagram of an image acquisition system in which the invention may be practiced.

FIG. 1 depicts a camera typical of which the invention may be practiced. The camera consists of a near UV through near IR wavelengths pass filter 101 upon which the light irradiating from the intended object impinges. In the case of focusing upon a license plate the light will be composed of the license plate background irradiance, the plate character irradiance and the state name. Light is focused upon an image sensor 102 using lens optical elements known in the art and not shown. In the preferred embodiment the sensor is an active pixel sensor (APS) as known in the art. The individual pixel locations accumulate charge during the exposure or total integration time of acquiring an image. The sensor further allows a plurality of reset voltages and reset times to be set through an exposure control interface 112. In one embodiment the exposure control interface 112 further includes a computing device such that the exposure parameters described throughout this application are done local to the camera. In another embodiment the camera further includes a global positioning device and digital compass and accelerometer (not shown) such that the location and orientation of the camera can be determined. The reset voltages may be selected and set conditionally such that only those pixels whose accumulated charge at the time of the reset ($T_{reset}$) exceed the reset Voltage $V_{reset}$ are reset to the reset voltage. The signal from the sensor is a sum of the sensor response plus noise 103 from the sensor electronics. Control parameters for the sensor include the integration time and the reference black voltage level. In other embodiments a plurality of slopes are used to optimize the acquired image data and enable sufficient contrast to recognize characters on the plate in images acquired at integration times and gains required to recognize characters on a rapidly moving vehicle in a variety of lighting conditions. After the total integration time the voltage signal from the senor signal is then fed into an amplifier 104, through a low pass filter 105 and then into analog to digital converter (ADC) 107. The gain of the amplifier 104 is a user selectable value and is further used in some embodiments of the invented camera control system. There is another element of noise 106 added to the signal from the amplifier and filter circuitry. In another embodiment portions of the sensors are connected to two or more ADC's 107. Although this aids in high-speed image acquisition and processing it can also lead to a channel mismatch between the multiple ADC's. Embodiments of the invention provide for matching of the output of multiple ADC's. A feature of an exemplary ADC's is that the top voltage is fixed but the bottom voltage or reset level may be variable or adjusted. Output from the analog to digital converter is a 10 bit digital video signal with a range of counts from max(i) to min(i) which is fed into the logic circuitry 108 and simultaneously on to image buffer circuitry 109 and a mapping circuitry logic 110 for mapping the 10 bit video image signal into an 8 bit output. The mapping circuitry logic includes embodiments of the invention that enable removal of artifacts due to non-functioning or malfunctioning pixels as well as accounting for channel mismatch in systems with multiple ADC channels. The resultant output 111 is an 8 bit still image of the object of interest, in this case a vehicle and its license plate driving on a roadway. In other embodiments 10 and 12 bit outputs may be obtained.

The purpose of the invented digital camera control system is to set sensor parameters the exposure control parameters of integration time, reset times, reset voltages and amplifier gains to ensure that images of the plate have sufficient contrast so that a features can be recognized against a background. In the preferred embodiment a license plate jurisdiction and registration can be accurately determined manually and automatically using computer character recognition systems. In the preferred embodiment the exposure control parameters are set through an a priori analysis of the anticipated image. That is the exposure settings are determined on the basis of time, location and orientation of the object relative to the camera prior to the time that the exposure is to be made to acquire an image.

Figure 2:
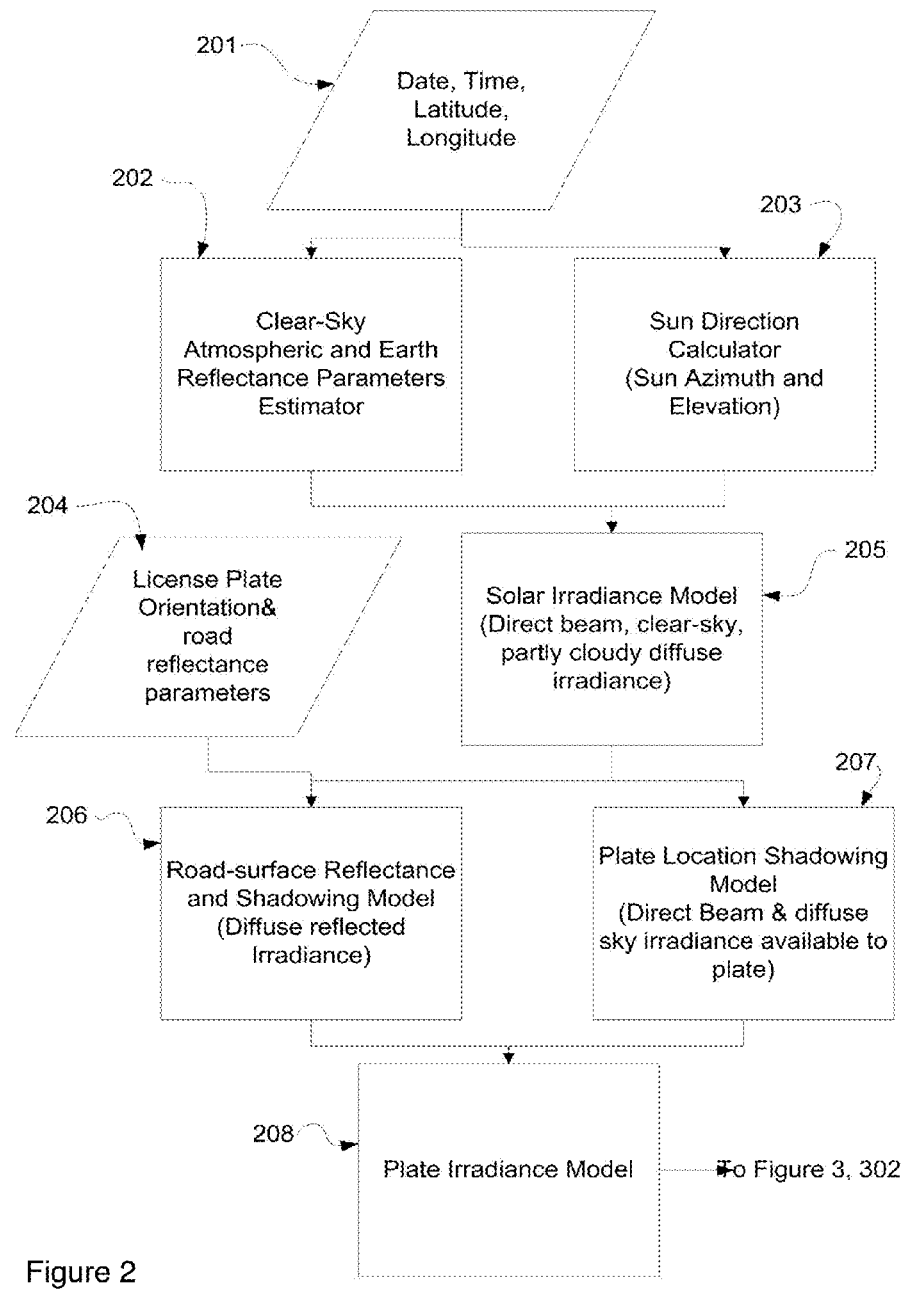
FIGS. 2 and 3 are block diagram and flow charts of various embodiments of the invention.
Figure 3:
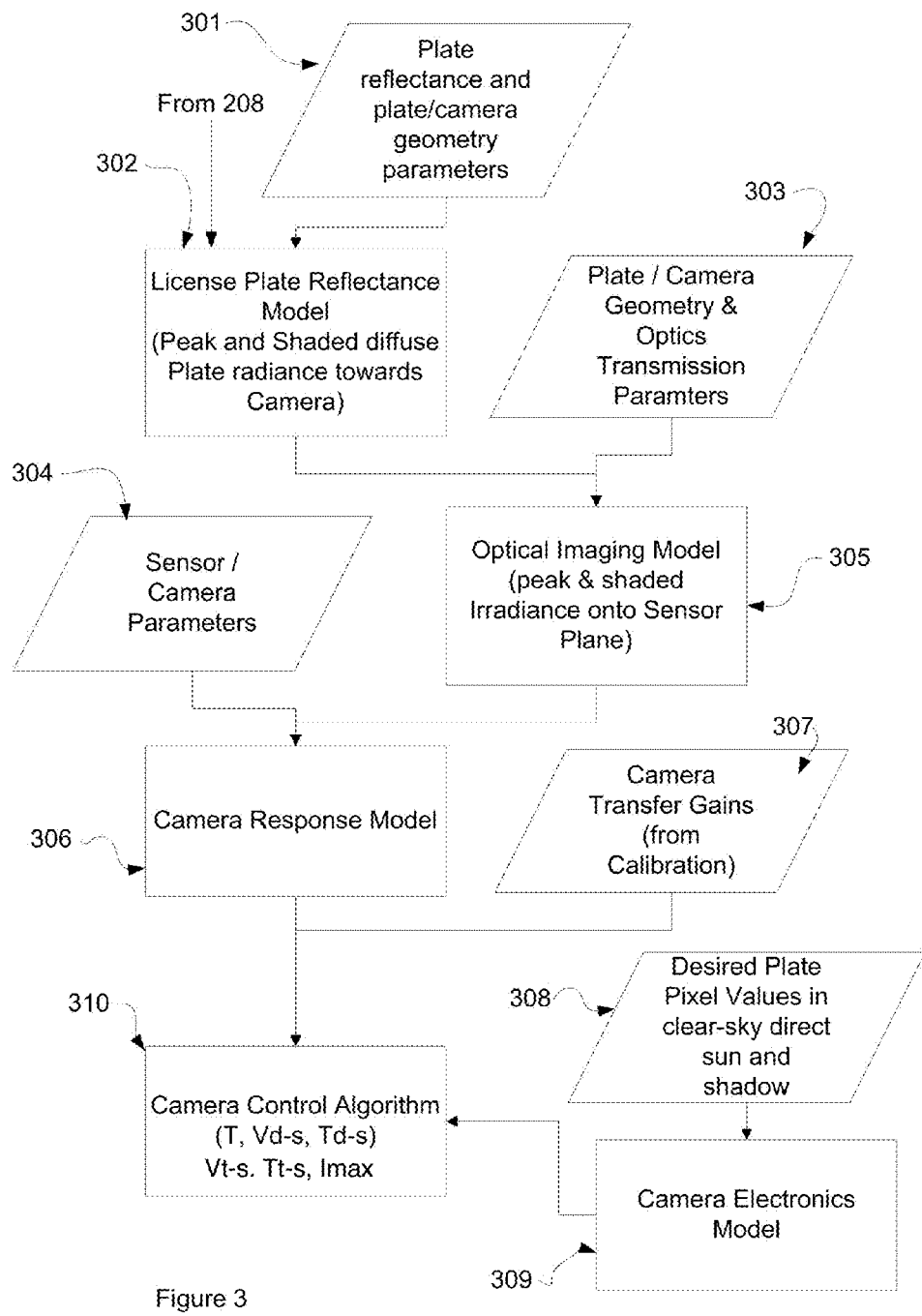

FIGS. 2 and 3 depict block diagrams of various embodiments of the invention. Details of each of the various embodiments are further discussed under the designated headings and in conjunction with the later Figures. Environmental variables 201 of date, time, latitude and longitude for the camera (and object) placement are fed to an estimator embodiment 202 that calculates the effect of atmospheric and earth reflectance on the illumination of the object. The same data is also fed into a calculator 203 that determines the sun direction, azimuth and elevation, with respect to the object of interest. Both of these sets of calculations enable an estimate of the solar irradiance 205. The irradiance model embodiment includes effects of direct beam illumination as well as the effects of both clear sky and partly cloudy sky diffuse irradiance. License plate orientation and road reflectance parameters 204 are combined with the output of the solar irradiance model 205 and fed to a road surface reflectance and shadowing model embodiment 206. The output of the road surface reflectance and shadowing embodiment is the diffuse reflected irradiance on the license plate from the road under the lighting conditions fed in at the first step 201 and the geometric and reflectance parameters 204. The output of the solar irradiance model and the license plate orientation parameters and road reflectance parameters 204 are also the input to a plate location shadowing model embodiment of the invention 207. In this model the direct beam and diffuse sky irradiance that impinge on a license plate are calculated. The plate may be tilted at any angle from vertical. The output of the road surface reflectance and shadowing model 206 and the output of the plate location shadowing model 207 are combined as input to the plate irradiance model 208 embodiment of the invention. Output of this model is the total irradiance for illumination onto the license plate. This irradiance model takes into account the time of day, season of the year, and direction of travel, as well as shadowing effects both from the vehicle itself and neighboring vehicles as well as roadway structures. Once the total irradiance onto the plate is known, the plate reflectance parameters along with the geometric parameters 301 describing the relative positioning and orientation of the license plate and the camera are combined with this total irradiance information into a license plate reflectance model 302. The model provides values for the radiance of the peak and shaded diffuse reflectance of the plate in the direction of the camera. Additional parameters related to the specific geometric relationships between the camera optics and the transmission properties of the optics 303 are fed along with the plate radiance into an optical imaging model 305. This model calculates the peak and shaded irradiance from the license plate that impinges onto the sensor. A camera response model 306 uses the irradiance onto the sensor with the parameters that describe the camera and sensor 304. The camera response model along with the camera transfer gains 307 obtained from calibration of the camera are fed into the camera control algorithm 310. Note that the calibration of the camera is a measure of the camera sensor response done offline and prior to the controls of the described system. The algorithm further requires input of the desired plate pixel values under the extremes of clear sky direct sun and for a plate in a shadow 308 filtered through the camera electronics model 309 to output 310 control values for the imaging integration time (T) the double slope reset voltage ($V_{d\text{-}s}$) and the double slope reset time ($T_{d\text{-}s}$). In another embodiment the integration is reset twice during the acquisition of an image and a second set of parameters corresponding to a second integration time Tt-s, a second voltage reset value Vt-s and a maximum sensor current Imax are further included as outputs from the Camera control Algorithm 310. These parameters are used to control the acquisition of a still image of the licenses plate from a rapidly moving vehicle under varying environmental conditions. Embodiments of the invention enable setting of the parameters T, $T_{d\text{-}s}$ and $V_{d\text{-}s}$ (and in the second embodiment Vt-s, Tt-s and Imax) a priori. The camera is thereby ready to acquire an image without the need to read and calibrate in real time as is typically done in the prior art. Acquisition of the image is done through an external triggering mechanism that is not part of the instant invention. The camera control values are selected such that there is sufficient contrast to recognize both the main numerals on the plate and the state or region identification characters. The image will be shown to have sufficient contrast for identification and recognition of both the numerals and the state or region of registration identified on the license plate. The following discussion provides details for each of the major embodiments discussed above. The sub-heading titles and corresponding numbers in the following sections refer to the embodiments and corresponding numbers of FIGS. 2 and 3.

Sun Direction Calculator 203

Figure 4:
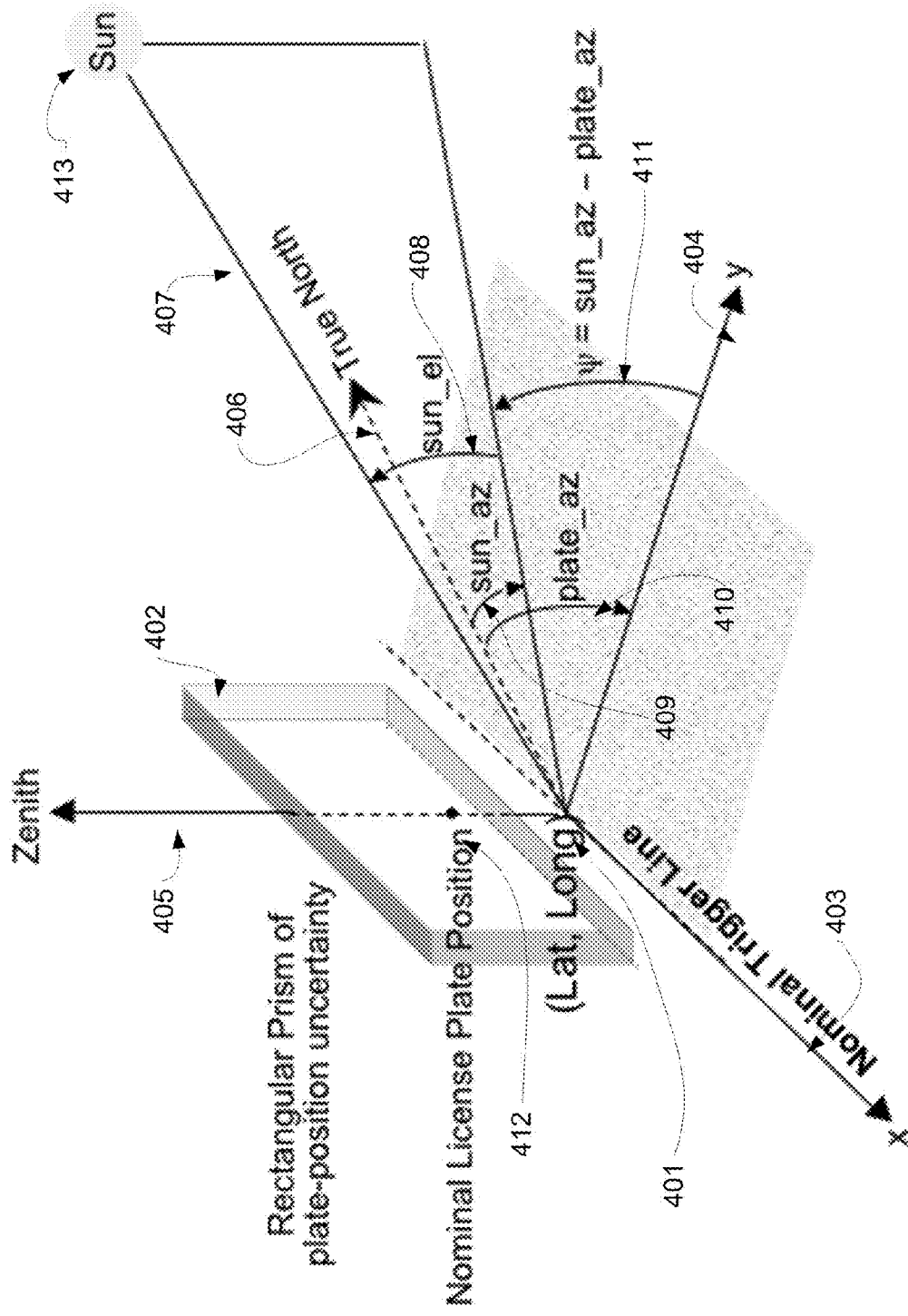
FIG. 4 is a diagram of the coordinate system used for the illumination model embodiments of the invention.

FIG. 4 depicts the sun direction calculator embodiment of the invention and introduces the coordinate system used for this and the other model embodiments. The origin of the coordinate system 401 is set at a point in the roadway that represents the intersection of the nominal trigger point for beginning image acquisition 403 and the center point 412 of the license plate 402. The x axis is in the roadway parallel to the license plate's long axis and perpendicular to the direction of travel of the vehicle. The y axis 404 is located in the roadway. The Zenith 405 completes an orthogonal axis system. Based upon the known latitude and longitude of the origin, and the known direction of travel of the vehicle, a true north direction 406 is determined. The parameters of date and time of day are then used to provide the elevation 408 and azimuth 409 of the sun for the time and location of the origin. Such azimuth and elevation data may be calculated using programs described in the publication: Ibrahim Reda and Afshin Andreas, *Solar Position Algorithm for Solar Radiation Applications*, National Renewable Energy Lab, TP-560-34302, November, 2005 which is incorporated by reference. Tabular data are available from references such as provided by United States Naval Operations (see http://aa.usno.navy.mil/data/docs/AltAz.php). The azimuth of the license plate 410 is also calculated in the same coordinate systems. The parameter Ψ is calculated as the difference in the azimuth of the sun and the plate:

$$\Psi = sun\_az - plate\_az \quad (1)$$

The parameters of the sun elevation (sun_el) and the parameter Ψ are used in the subsequent irradiance and shadow models discussed below. The parameters are recalculated periodically during the day and fed into the remaining models to adjust for the time of day and date.

Clear-Sky and Earth Reflectance Parameters 202

Figure 5:
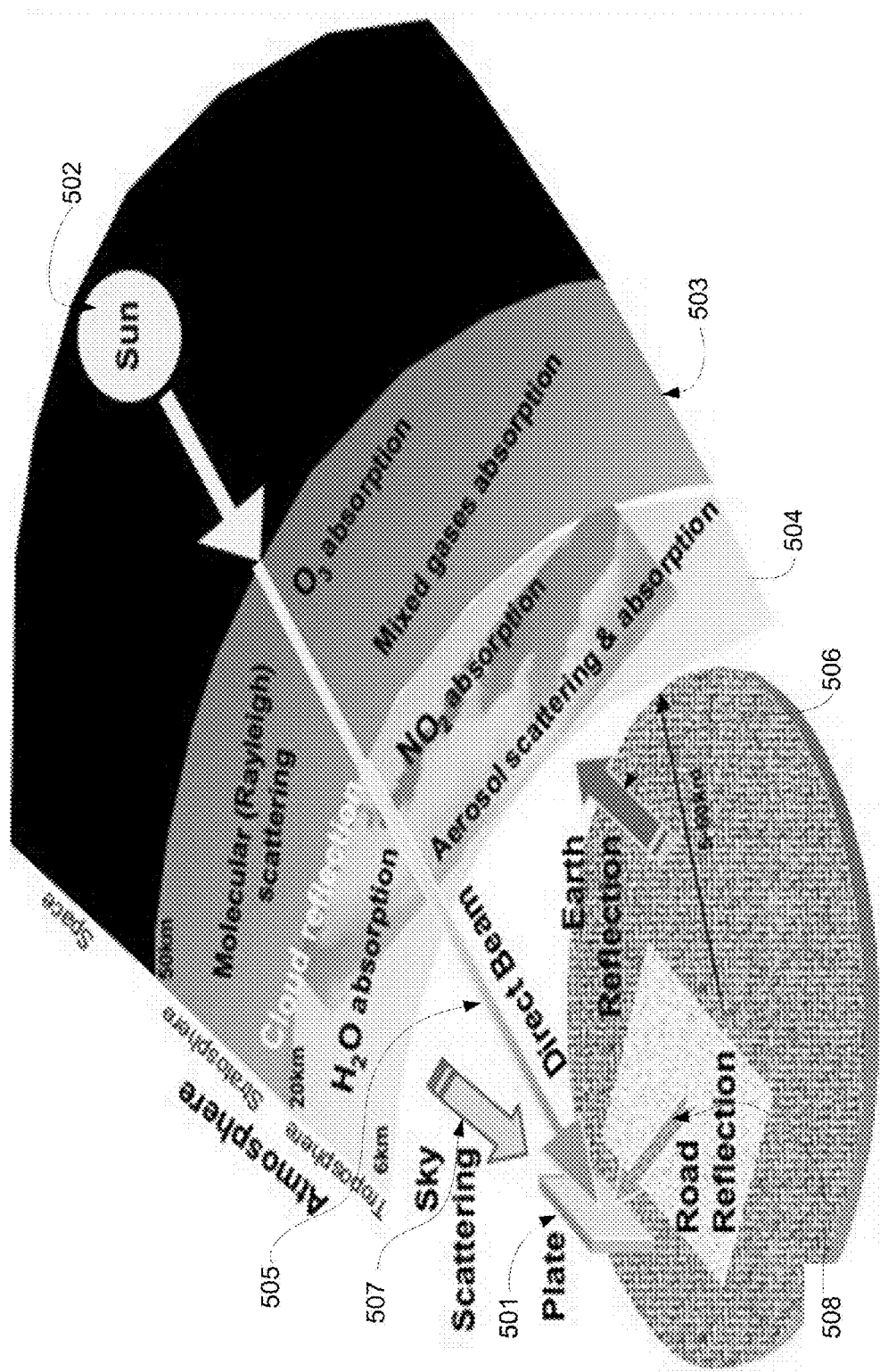
FIG. 5 depicts the irradiance model for lighting of a license plate.

FIG. 5 is a diagram of the factors affecting the irradiance of the license plate 501. Light from the sun 502 may reach the plate through a direct beam 505 as long as the plate is not shadowed. The direct beam intensity is reduced by scattering and absorption in the stratosphere 503 and further reduced by scattering, adsorption and reflectance off clouds in the troposphere 504. The direct beam light from the sun is also reflected off the earth surface 506 and re-reflected 507 back to the earth primarily from clouds. In the vicinity of the plate there is also a reflection off the road 508 that further illuminates the plate. The plate is therefore illuminated by the direct beam from the sun, by re-reflected light from the sky and by light reflected off the road surface. An embodiment of the invention provides an estimate of the total irradiance upon the plate that takes into account all of these sources of illumination. The direct beam irradiance for a cloudless sky is estimated from models equivalent to that presented in Gueymard, C. A., *REST2: High-performance solar radiation model for cloudless-sky irradiance, illuminance, and photosynthetically active radiation—Validation with a benchmark dataset, Sol. Energy*, Elsevier (2007), which is incorporated by reference. Photosynthetically active radiation (PAR) is coincidentally the wavelength response band for the imaging sensors used in the exemplary camera system. Sensors having different wavelength sensitivity use models appropriate to the wavelength of maximum sensitivity of the sensor.

Solar Irradiance Model 205

The total solar irradiance is given by three factors: the normal beam irradiance, $P_n$, the diffuse sky irradiance, $P_{eds}$, and the diffuse road irradiance $P_{rs}$. If the nominal plate location is within a shadow then only diffuse irradiance from the sky and the road will illuminate the plate. If the plate is not within a shadow then all three sources apply. The normal sky irradiance $P_n$ is calculated using models such as that described immediately above. The Diffuse sky irradiance assumes a reflective parameter for the earth surface to estimate the direct beam radiation ($P_n$) that is reflected skyward and then an additional cloud factor for the re-reflection of this radiation back to earth. The re-reflected radiation ($P_{eds}$) is diffusely scattered off the clouds. Similarly the radiation reflected off the road surface requires an estimate of the reflectivity of the road surfaces and uses this parameter to calculate the amount of direct solar radiation ($P_n$) that is diffusely reflected from the road ($P_{rs}$).

Shadowing Models 206, 207

Figure 6:
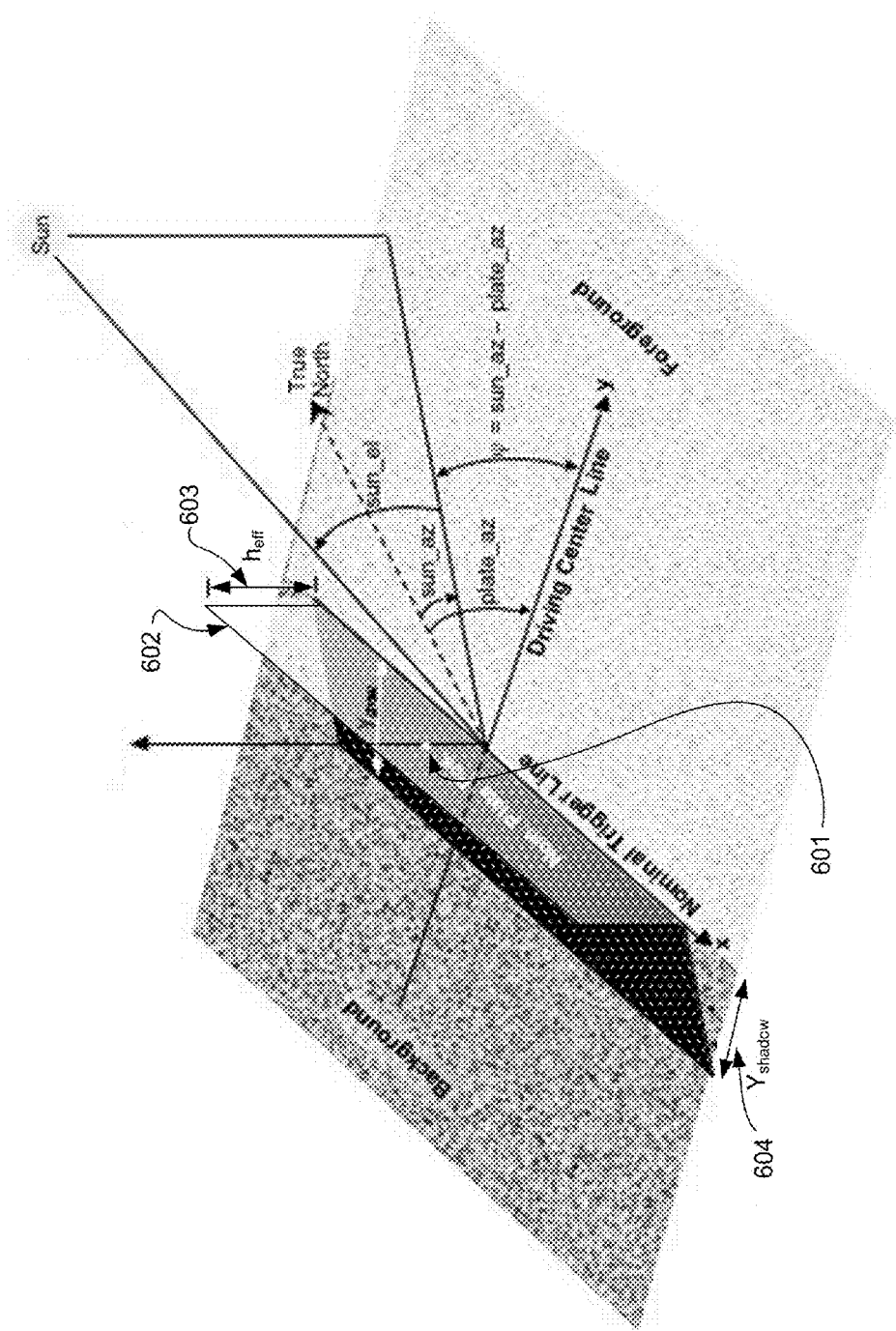
FIG. 6 depicts a road surface shadowing model embodiment accounting for the road shadowing from the vehicle carrying the plate, adjacent vehicles and nearby structures.
Figure 7:
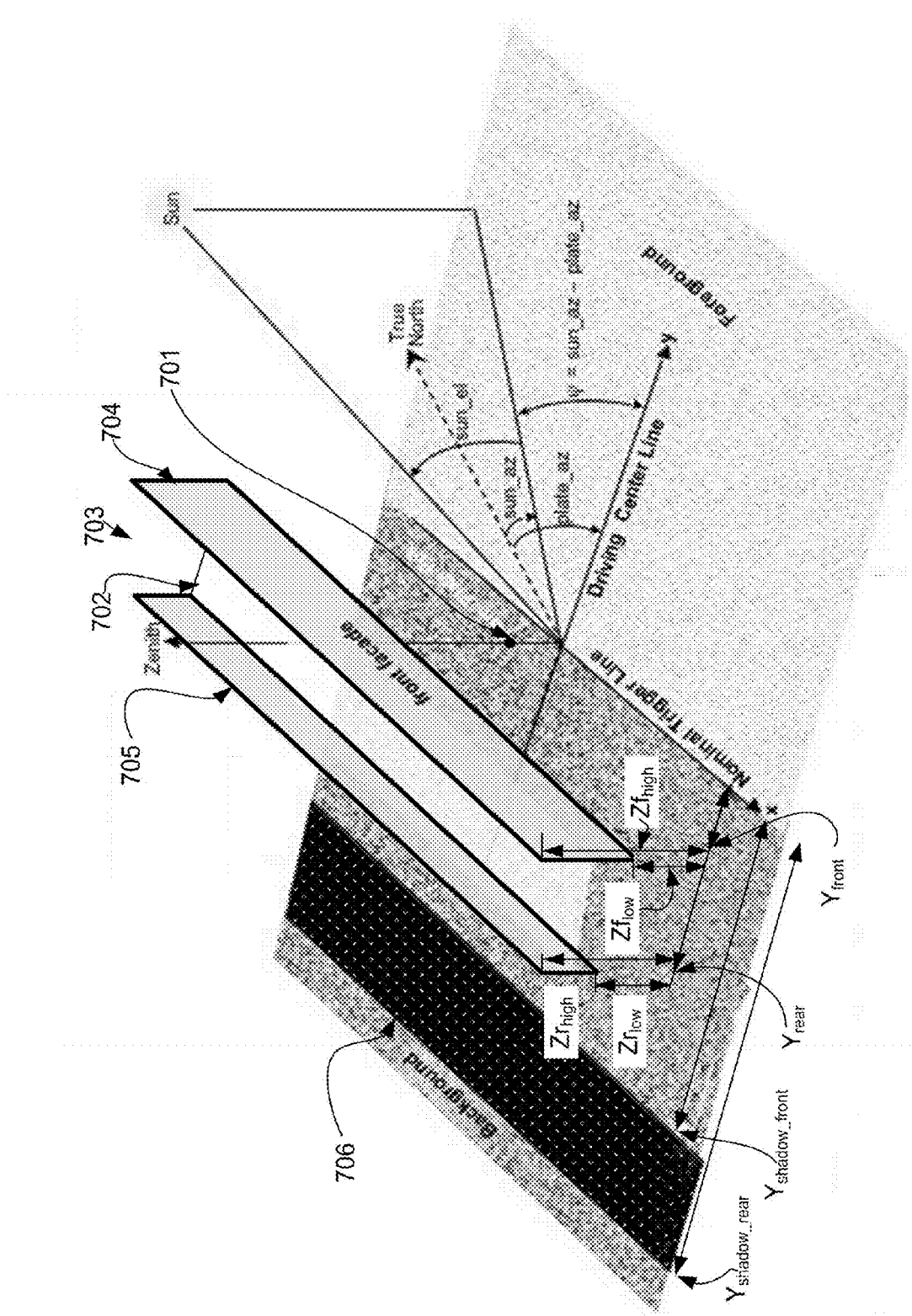
FIG. 7 depicts a road shadowing model embodiment accounting for the road shadowing from a canopy.

In other embodiments, the total irradiance on the plate takes into account not just the sources of light but also the shadowing of the plate. Embodiments of the invention account for two primary sources of shadows. FIG. 6 is a diagram of the model for shadows arising form the vehicle carrying the plate and other nearby ground level objects. FIG. 7 is a model for the shadow created by the overhead structure of the canopy of a typical toll booth structure. Referring to FIG. 6, the coordinate system is the same as has already introduced. The nominal plate location 601 is located above the origin of the coordinate system. The vehicle carrying the plate, adjacent vehicles in adjacent lanes and toll booths and the support structures are modeled as an infinitely wide vertical plane 602 located along the x-axis, nominal trigger line with a fixed vertical height of $h_{eff}$ 603. $h_{eff}$ is estimated based upon the actual structures within the particular tollbooth setting. Typical values for $h_{eff}$ are 3 to 10 feet depending upon actual structures in the area to be imaged. The resultant shadow 604 is then an infinitely wide strip with one edge located on the x-axis trigger line and the other edge located in the y-direction given by:

$$Y_{shdw} = -h_{eff} * \cos(\text{sun\_el}) * \cos \Psi / \sin(\text{sun\_el}) \qquad (2)$$

Where $Y_{shdw}$ is the y-coordinate of the shadow edge 604, sun_el is the solar elevation and $\Psi$ is the difference between the solar azimuth and the plate azimuth defined earlier. The sun_el is greater than 0 implying that the time is between sunrise and sunset. The value of $Y_{shdw}$ is greater than zero for shadows in the foreground and $Y_{shdw}$ is less than zero for shadows in the background as shown in FIG. 6.

In another embodiment, shadows in imaging the license plate that arise form the canopy of the toll booth are estimated. Referring to FIG. 7, again the nominal plate position 701 is in the same now familiar coordinate system. The canopy 702 is modeled as an infinitely wide (in the x-direction) horizontal plane 703 located above and parallel to the x axis with a fixed length in the y-direction and with vertical front 704 and rear 705 facades. The front edge of the canopy may be displaced from the x-axis nominal trigger line and the coordinate is given by $Y_{front}$. The rear edge of the canopy is located at $Y_{rear}$ and the width of the canopy horizontal plane is the difference between these coordinates. The dimensions of the front and rear facades are given by their z-coordinates as indicated in the Figure. The shadow cast by the canopy 706 is an infinitely wide stripe parallel to the x-axis trigger line with coordinate locations for the front and rear edges given by the following formulae:

$$\text{Projection\_slope\_fctr} = \cos(\text{sun\_el}) * \cos(\Psi) / \sin(\text{sun\_el}) \qquad (3)$$

$$Y_{frntshdw} = \max[(Y_{frnt} - zf_{high} * \text{projection\_slope\_fctr}),\\ (Y_{frnt} - zf_{low} * \text{projection\_slope\_fctr})] \qquad (4)$$

$$Y_{rearshdw} = \min[(Y_{rear} - zr_{high} * \text{projection slope\_fcrt}),\\ (y_{rear} - zr_{low} * \text{projection\_slope\_fctr})] \qquad (5)$$

The sun_el is greater than zero and less than 180 degrees.

License Plate Reflectance Model 302

Figure 8:
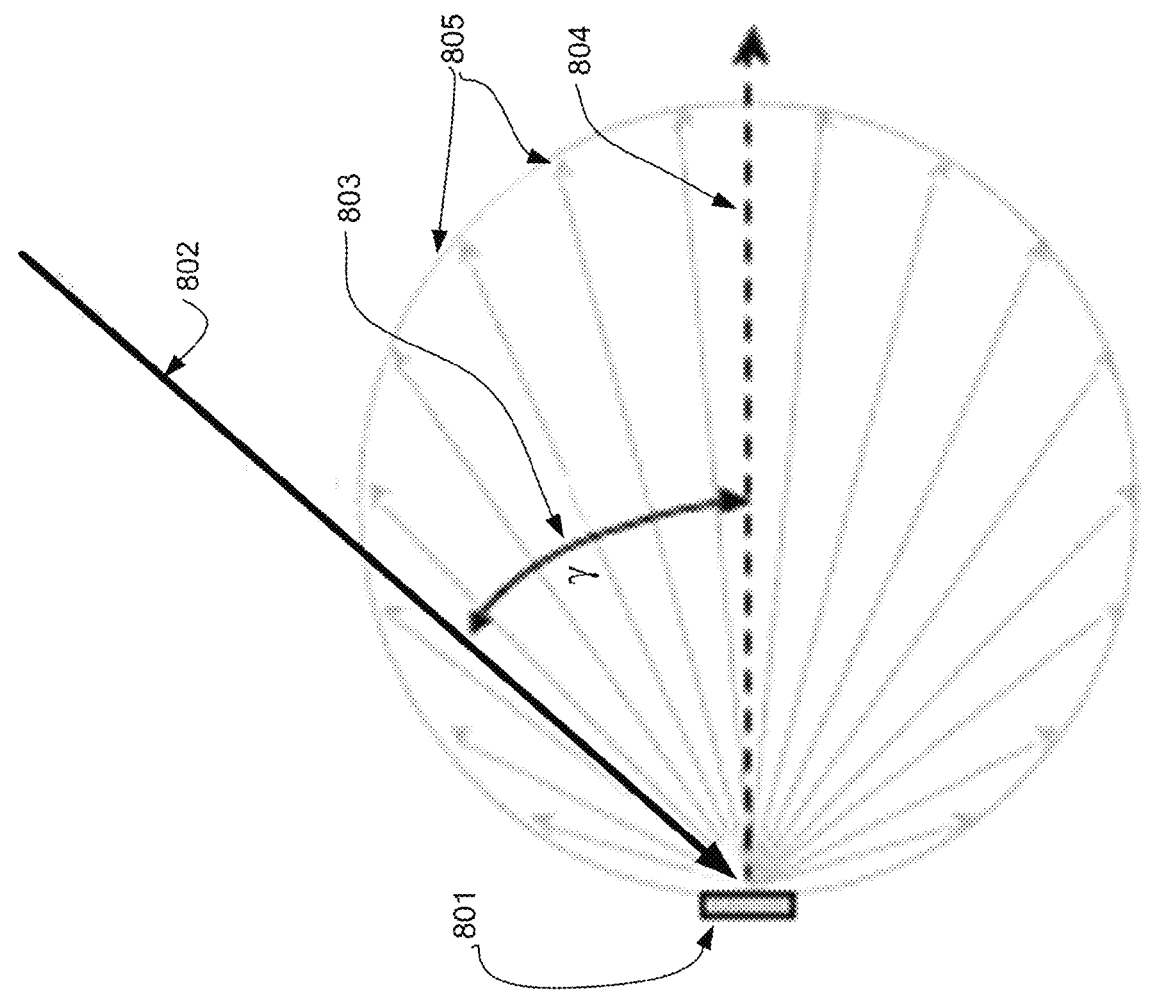
FIG. 8 depicts an object radiance model embodiment for a beam illumination.

Reflectance off the license plate or the radiance of the plate must be calculated as a function of viewing angle. The ultimate goal is to combine the lighting and shadowing models to provide an estimate of the plate light that reaches the camera sensor. The license plate material is assumed in all the following cases to behave as a diffuse Lambertian reflector. In another embodiment specular components are included as well. Radiant power per unit solid angle per unit projected area is constant in the direction of view. The emitted radiant power falls off as the cosine of the viewing angle. FIG. 8 depicts the radiance resulting from the direct beam irradiance of the license plate. The solar beam 802 is incident upon the plate 801 at an angle γ 803 from the plate normal 804. The plate material is assumed to be a white retro-reflective license plate sheeting such as that manufactured by the 3M® company since this is commonly employed white material for license plate objects. A portion of the beam will be absorbed by the plate material, a portion will be retro-reflected along the incident beam 802 and the remainder will be diffusely reflected in angles as depicted by the rays 805. The absorption coefficient and the coefficient of retro-reflectivity are functions of the material properties of the license plate sheeting material. For the exemplar material (such as 3M® 4750E and 4780E retro-reflective sheeting), the absorption is 5% and the background of the plate is white. Absorption coefficients and background color for other plates are selected on the basis of the actual plate material properties. That is in some embodiments the model includes parameters specific to a particular set of plates known to be prevalent in the region where the invention is being practiced. In another embodiment a plurality of plate material properties are used and the selected parameters are a best compromise for the range of plate materials used. All wavelengths of light within the camera's spectral response range are therefore assumed to be reflected equally by the plate. The coefficient of retro-reflectance of direct beam irradiance is a function of the plate material. For the exemplar 3M material the retro-reflectance is given by a simple approximation:

$$R_A(\alpha) = -0.0158*\alpha + 0.7787 \text{ with } R_A(\alpha) > 0 \quad (6)$$

Again, for other materials and if a more exact retro-reflectance value is required other, more complex models can be employed. The retro-reflected beam is given by:

$$P_{en}*R_A \quad (7)$$

Where $P_{en}$ is the direct beam irradiance. It is a rare event that the sun, plate, and the camera are aligned such that the extremely narrow retro-reflected beam is actually imaged by the camera. The diffuse radiance from the plate due to direct beam illumination will however always be imaged by the camera as long as direct beam illumination is hitting the plate (see shadow models above). The diffuse reflected radiance due to direct beam irradiance is given by:

$$B_b = Pen*(1-R_A(\alpha))*\rho_p*\cos(\gamma)/\pi \quad (8)$$

Where $B_b$ is the diffuse beam radiance and $\rho_p$ is the license plate material coefficient of diffuse reflectance.

Figure 9:
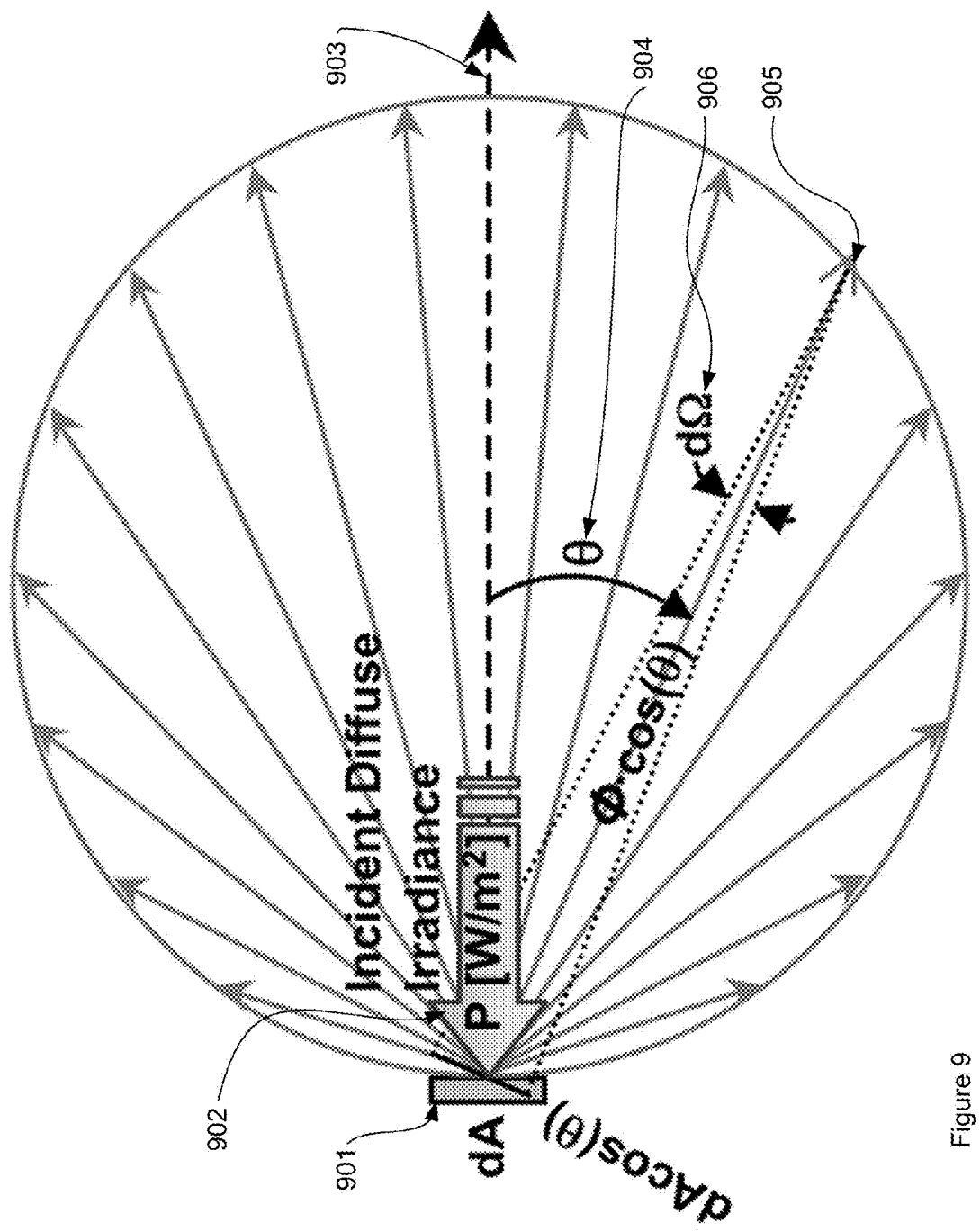
FIG. 9 depicts an object radiance model embodiment for diffuse illumination.
Figure 10:
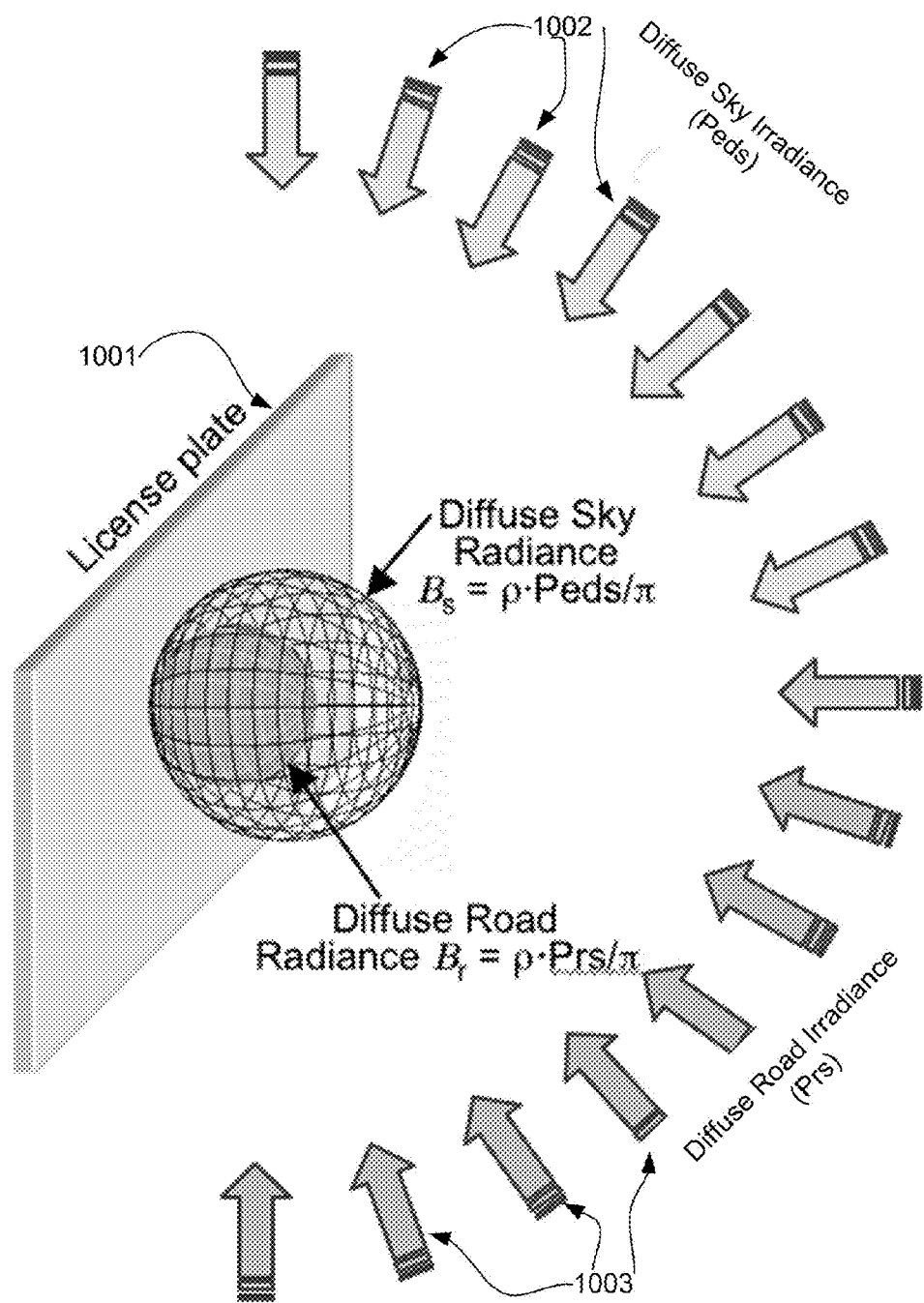
FIG. 10 depicts an object radiance mode embodiment for various sources of illumination.

The license plate is also illuminated by light diffuse reflected from the roadway and sky and the radiance from the plate will have a component for this diffuse irradiance. The diffuse irradiance arises both from light reflected off the road and from light reflected off the earth surface and then reflected back to earth from mainly clouds. FIG. 9 depicts the plate radiance due to this diffuse irradiance component. Diffuse irradiance 902 impinges onto the plate surface 901. An observer at any point 905 in the vicinity of the plate will observe the same radiance regardless of the viewing angle θ 904 from the normal 903 to the plate surface. The reflected diffuse radiance is given by:

$$B = \rho P/\pi \quad (9)$$

where B is the radiance from the plate due to diffuse irradiance, ρ is the plate diffuse reflectance and P is the incident irradiance. FIG. 10 depicts the total radiance from the plate 1001 due to diffuse irradiance. The total diffuse irradiance arises from the sky ($P_{eds}$) 1002 and from the road surface ($P_{rs}$) 1003. The diffuse sky irradiance arises from the direct sunlight that is reflected off the earth and then re-reflected off clouds and particulate back to earth. The diffuse road irradiance 1003 arises from light that is reflected off the local road surface. In both cases equation 9 applies for the radiance from the plate:

$$B_s = \rho P_{eds}/\pi \quad (10)$$

$$B_r = \rho P_{rs}/\pi \quad (11)$$

where $B_s$ is radiance from the plate due to diffuse sky irradiance $P_{eds}$ and $B_r$ is the radiance off the plate due to diffuse road irradiance $P_{rs}$. ρ is the license plate surface material coefficient of diffuse reflectance.

Optical Imaging Model 305

Figure 11:
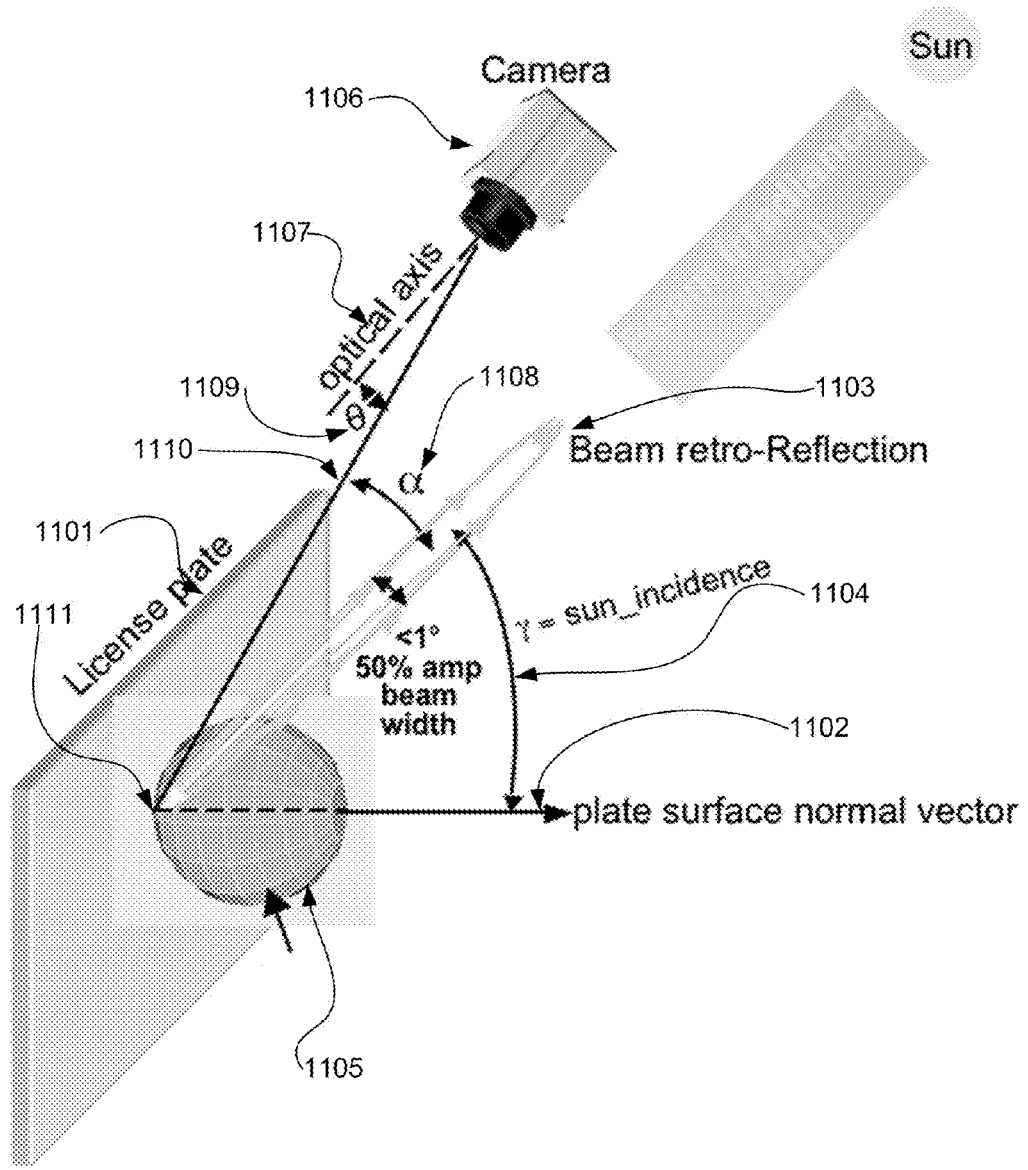
FIG. 11 depicts an object radiance model embodiment further showing camera placement geometry.
Figure 12:
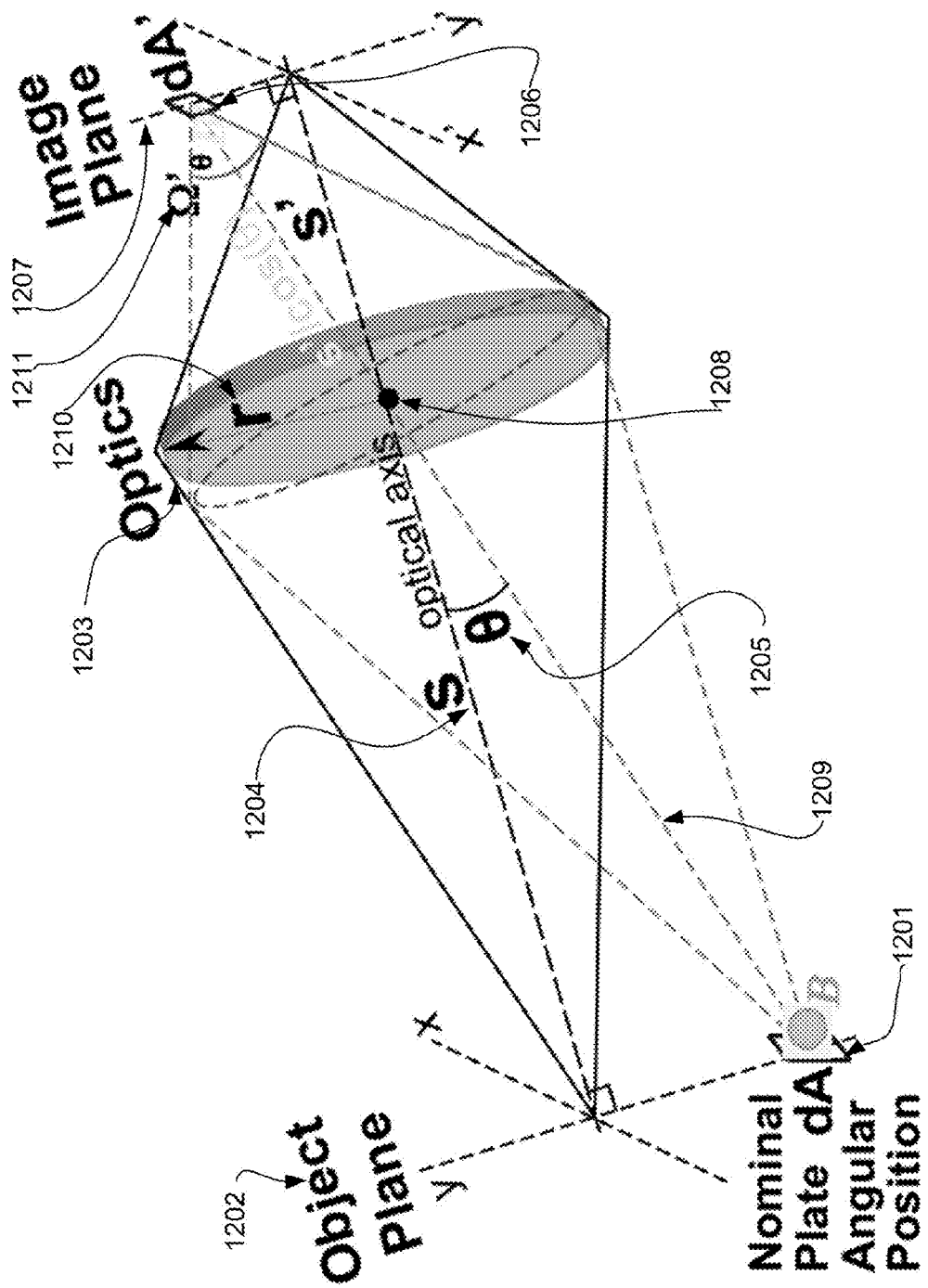
FIG. 12 depicts the geometric arrangement related to an image formation model embodiment of the invention.

Further embodiments of the invention include the total radiance from the plate that impinges upon the camera's sensor. FIG. 11 depicts the geometric relationships between the license plate 1101 and camera 1106. The license plate 1101 is located at the nominal plate position 1111 as defined in previous discussions of the coordinate system used in the invention. The angular direction of the plate is accounted for by calculating irradiance and radiance in terms of the plate surface normal vector 1102. Illumination and reflection from the plate is defined in terms of the surface normal vector. The direct sun beam 1103 is incident on the plate at an angle γ 1104 from the plate normal vector. The optical axis 1107 of the camera makes an angle θ 1109 with a line 1110 drawn from the nominal plate position center to the camera's optical focal point. The total diffuse plate radiance 1105 is the sum of the diffuse beam radiance plus the direct beam diffuse radiance discussed above. The extremely narrow retro-reflected beam is rarely imaged by the camera. FIG. 12 depicts a more detailed view of the camera optics in the coordinate system. The plate is at the nominal plate position 1201. An area of the plate dA produces an image dA' at the image plane 1207 of the camera sensor. The optics of the camera system 1203 have an optical axis 1204 that makes an angle θ 1205 with the line 1209 drawn from the center of the optics 1208 and the nominal plate position. The object plane 1202 is along the optical axis 1204 and at a distance s from the center of the optics 1208. The image of the plate is formed at the image plane 1207 which is at a distance s' from the center of the center of the optics 1208. The radius of effective aperture of the lens is shown as r 1210. Using the lens equation:

$$1/fL = 1/s + 1/s' \quad (12)$$

where fL is the focal length of the lens implies that for s>>fL, s'≈fL. The f-number of the optics is defined as:

$$f\# = fL/(2r) \quad (13)$$

and substituting gives:

$$r/s' = 1/(2f\#)$$

The off axis irradiance L received on the image plane at plate pixel area dA' is:

$$L = B'\Omega'_\theta \cos(\theta) \quad (14)$$

B=B' for a Lambertian emitter and lossless optics where B is the object radiance and B' is the image radiance. The solid angle formed by off-axis projection of the exit pupil and position of the nominal plate in the image is $Q'_\theta$:

$$Q'_\theta = [\pi r^2 \cos(\theta)]/[s' \cos(\theta)]^2 = \pi((r/s')')^2 \cos^3((\theta)) \quad (15)$$

Substituting gives:

$$L = (\pi/4)B \cos^4(\theta)/(f\#)^2 \quad (16)$$

L is the irradiance on the sensor due to the light reflected from the license plate. In one embodiment, the contrast control embodiment of the invention, discussed below, sets camera parameters such that the sensor saturates at the value for radiance of the license plates' white background.

Camera Response Model 306

Figure 13:
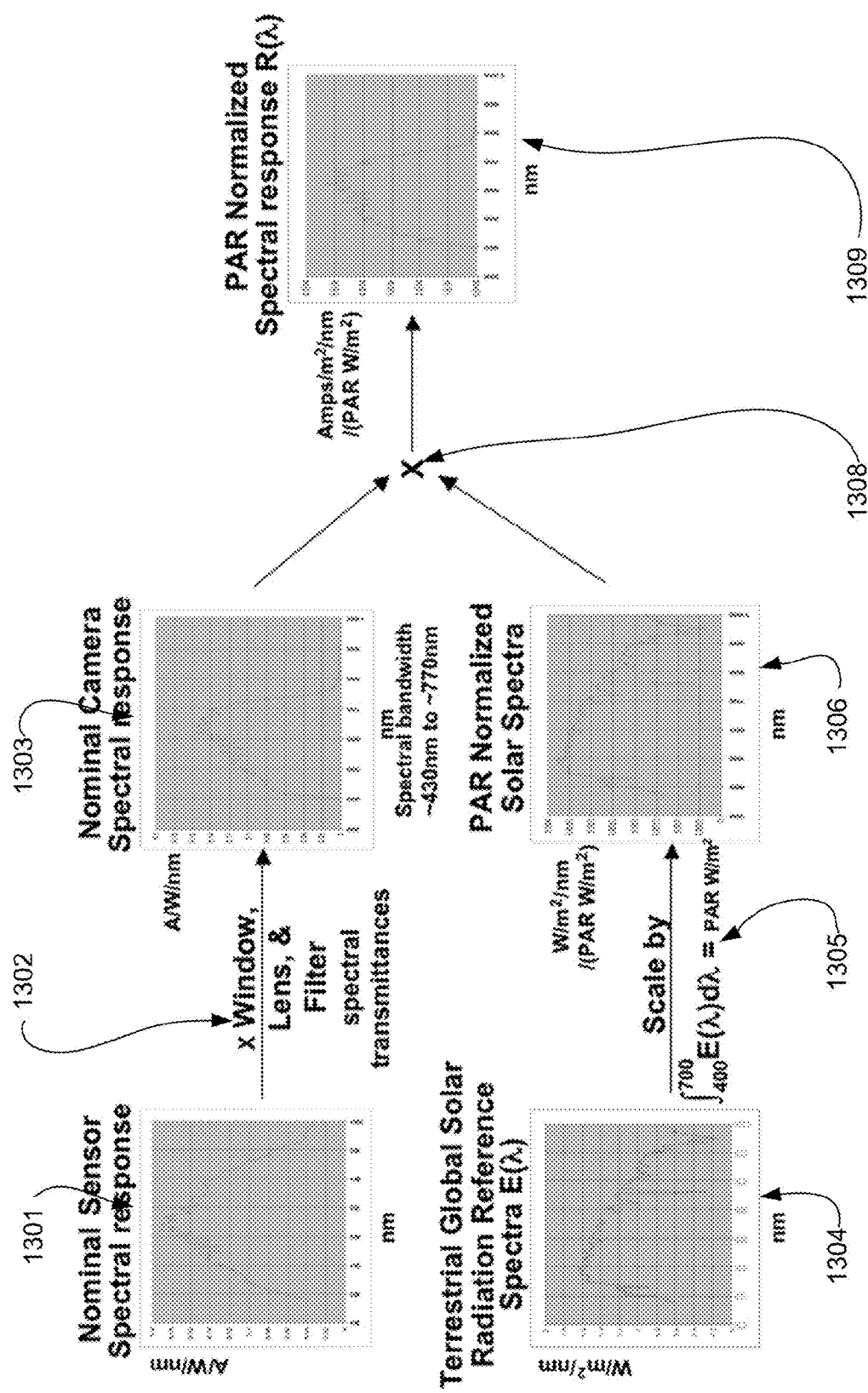
FIG. 13 depicts a camera response model embodiment of the invention.

The light irradiating the sensor can now be combined with the response parameters for the camera to give an estimate of the voltages generated by the sensor in response to the light. Referring to FIG. 13, The nominal spectral response of the sensor 1301 is scaled by the spectral transmittance of the optics 1302 including the window that encloses the camera, the lens, and filters to provide a nominal spectral response 1303 for the sensor. Similarly the terrestrial global solar radiation reference spectrum 1304 is scaled by the integral of the intensity over the wavelength region of interest 1305 to provide a photosynthetically active radiance (PAR) normalized solar spectrum 1306. The cross product 1308 of these spectra produces the PAR Normalized Spectral response R(λ) 1309. The voltage generated by the sensor may be now calculated as follows. The integral of the PAR normalized spectral response R(l) over the region of interest defines $R_{fctr}$:

$$R_{fctr} = \int R(\lambda) d\lambda \quad (17)$$

The plate pixel voltage change is given by:

$$\Delta V_{pixel} = dA' * \text{fill}_{fdtr} * R_{fctr} * L * T * k = k_o * L * T \quad (18)$$

Where $\Delta V_{pixel}$=the plate pixel voltage change
dA'=physical size of the pixel cell
$\text{fill}_{fctr}$=fraction of dA' that responds to light
L=PAR irradiance incident on the pixel
T=sensor integration time
k=sensor conversion gain.

The constants k and therefore $k_0$ represent material properties of the sensor and are determined empirically through calibration of the camera that typically takes place prior to site installation.

Camera Electronics Model 309

Figure 14:
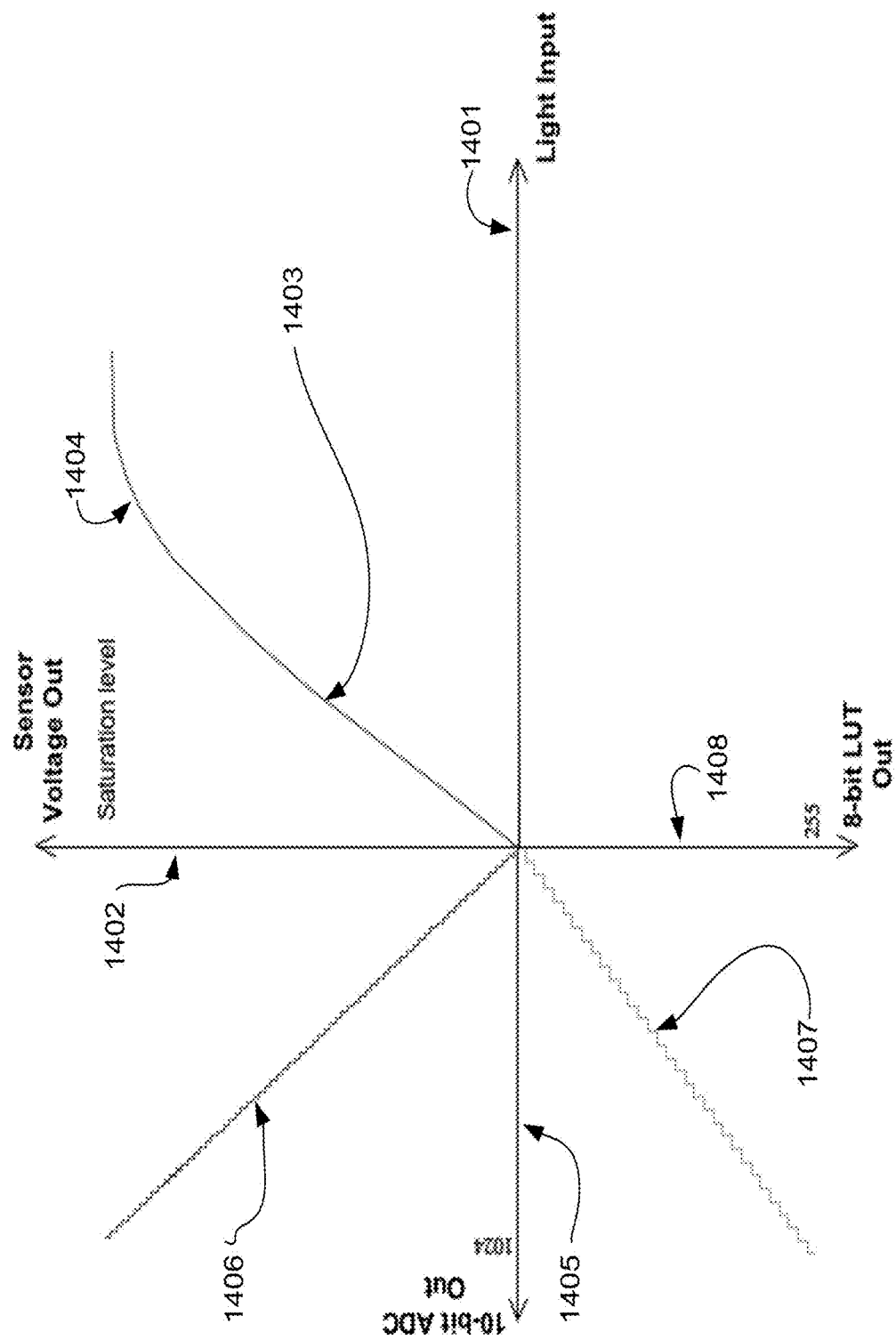
FIG. 14 shows the camera transfer function.
Figure 15:
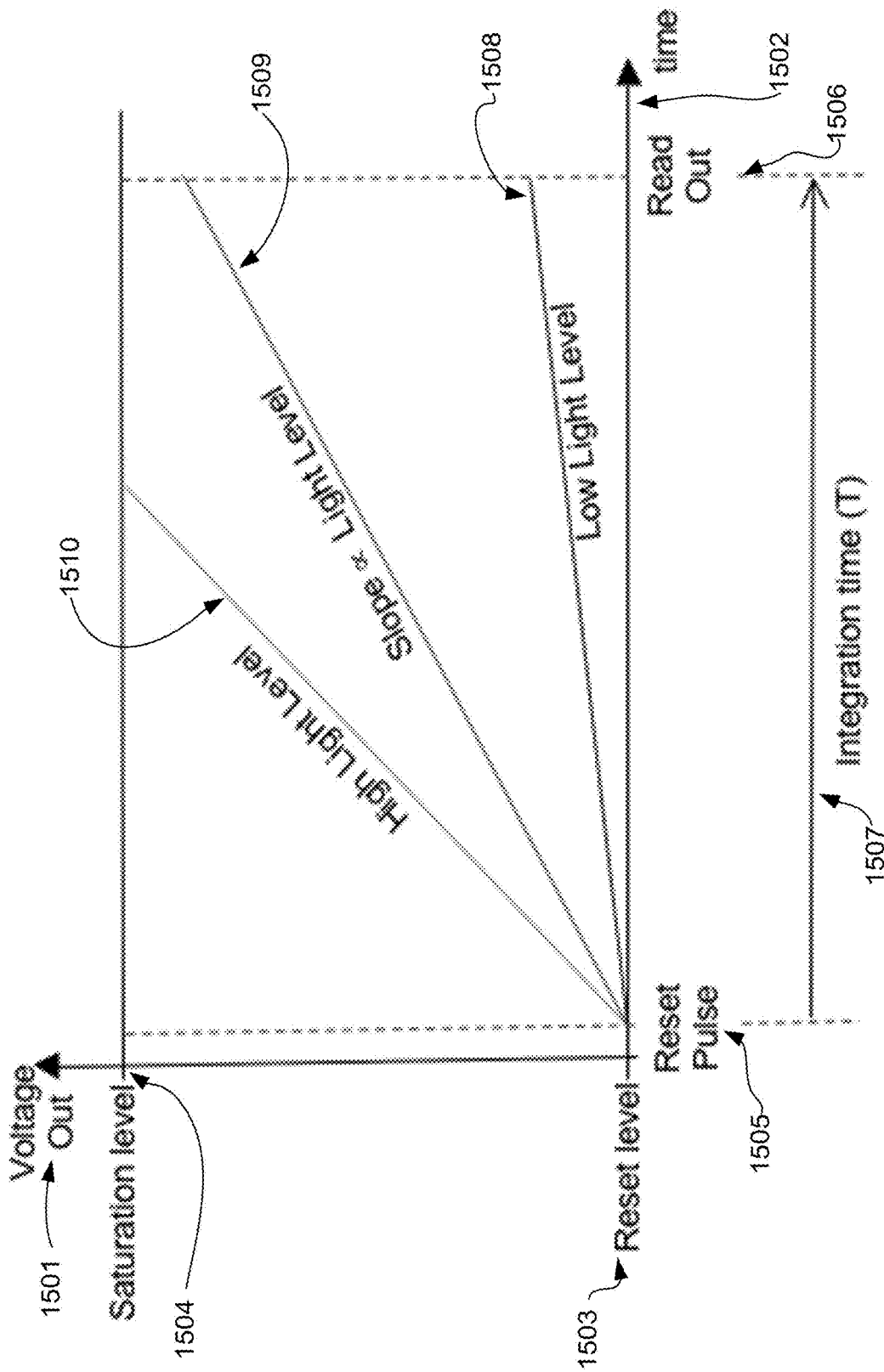
FIG. 15 shows the pixel voltage output versus integration time.

The camera sensor response is depicted in FIG. 14. The positive x-axis 1401 represents light input and the positive y-axis 1402 is the voltage output for a given light input. The sensor response curve includes a linear region 1403 and a saturation region 1404. The output of the analog to digital converter is a 10 bit number ranging from 0 to 1023 at saturation shown along the negative x-axis 1405. In another embodiment, explained below, this 10-bit output is mapped to an 8-bit output 1407 shown along the negative y-axis 1408. The response of the sensor is also a function of the integration time as shown in FIG. 15. The total integration time (T) 1507, shown along the x-axis 1502, begins at the time of a reset pulse 1505 and ends at the time at which output is read 1506. Likewise the output voltage of the sensor, shown on the y-axis 1501, ranges from the voltage reset level 1503 to as high as the saturation level 1504. The outputs for three different light levels are shown. The slopes of the curves are proportional to the light levels. At low light levels 1508 and intermediate light levels 1509 the voltage out will be proportional to the input light intensity. However at high light levels the response will reach saturation prior to the end of the integration time. In the contrast control embodiment of the invention exposure parameters are selected such that the effective gain for the low light level is increased to increase contrast under low light conditions and the effective gain for the high light level conditions is decreased to provide usable output short of saturation. The contrast control embodiments adjust total and intermediate integration times and intermediate reset voltages to allocate the dynamic range for both low and high level lighting situations and make full use of the entire dynamic range regardless of lighting conditions.

Camera Control Algorithm 310

Figure 16:
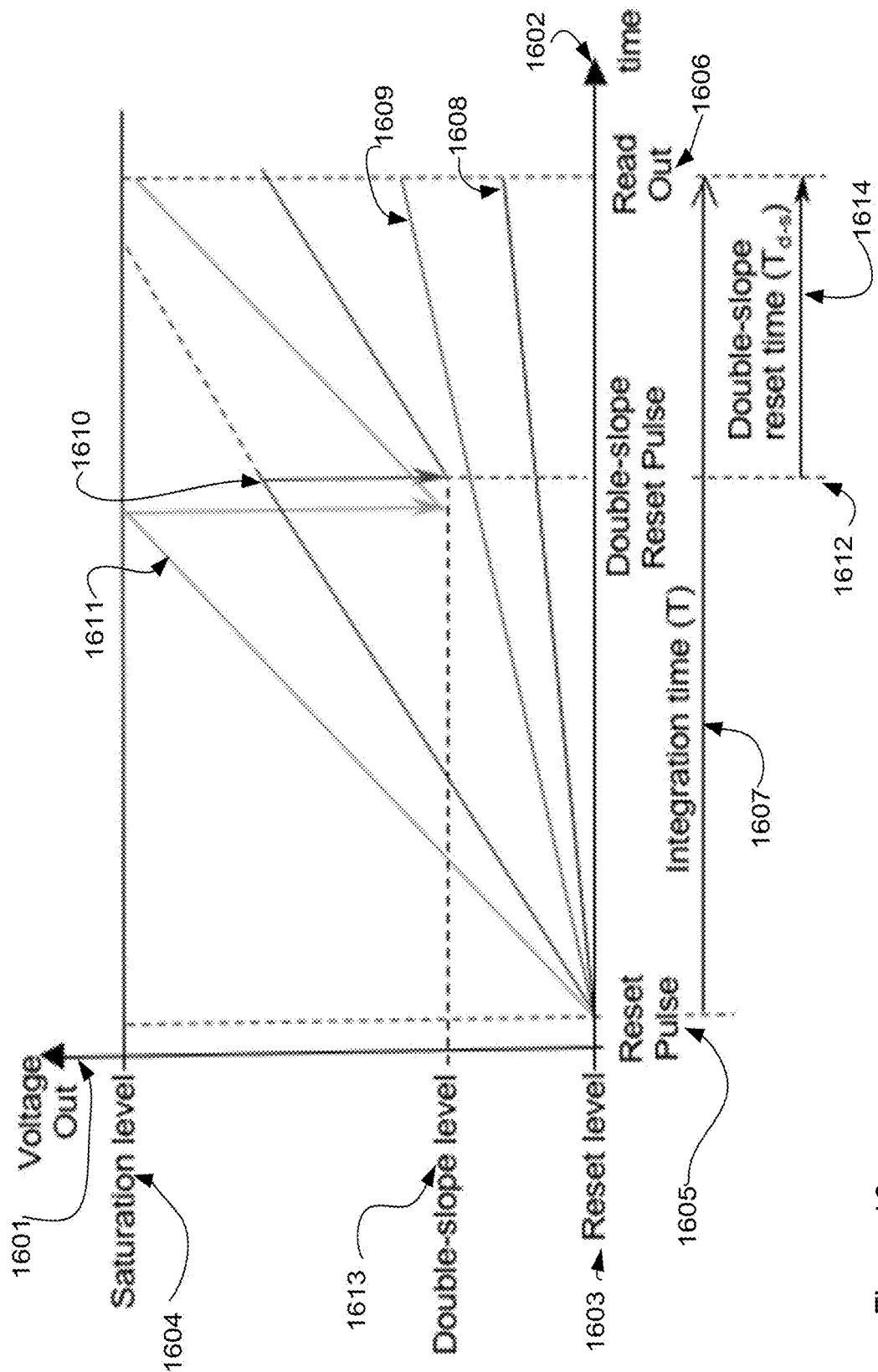
FIG. 16 shows the double-slope extended dynamic range embodiment for pixel output.

The predictive model embodiments of the invention discussed above, essentially provides a virtual light sensor that predicts the maximum daylight plate irradiance for a plate that is located in the shade and the maximum daylight plate irradiance for a plate that is located in bright sunshine. The predictions are based upon sun position and shading caused by the vehicle itself and nearby cars and structures. The camera imaging model and camera response model embodiments predict the camera image pixel values of the plate object to these varying irradiation predictions. These predicted values are then used to set control parameters for the camera. The control algorithm makes use of multiple slope integration control to provide optimum imaging for the broad range of predicted lighting conditions. FIG. 16 provides a diagrammatic description of an exemplary double slope control algorithm. The x-axis 1602 represents lapsed time during the imaging process and the y-axis 1601 represents the sensor output. The sensor output ranges from the reset level 1603 to the saturation level 1604 and the total integration time (T) starts at the time of the reset pulse 1605 and ends at the readout time 1606. Image acquisition begins with a reset pulse setting the voltage to the reset level and beginning the integration cycle. At some intermediate time 1612 a double slope reset pulse resets the voltage for some of the pixels to a double slope voltage level 1613. In the preferred embodiment the reset time 1612 and the reset level 1613 are pre-selected based upon a model of the anticipated image. Only the pixels with a voltage greater that the double slope level 1613 at the time of reset 1612 are reset. Those below the reset voltage at the time of the reset pulse 1612 are not affected. The integration continues after the reset pulse until the readout time 1606. The time from the reset pulse to the readout is the double slope reset time ($T_{d-s}$). Four different exemplary curves are shown in FIG. 16. Curves 1608 and 1609 would represent responses for relatively low lighting conditions. At the time of the double-slope reset pulse 1612 both of these curves are below the double-slope level 1613 and are therefore not reset. Note that curve 1608 never reaches the double-slope level and curve 1609 exceeds the double slope level prior to the end of the integration time. Both response curves represent situations that would not be reset. The response curves 1610 and 1611 represent higher intensity lighting conditions that would result in reset at the time 1612 of the double slope reset pulse. Curve 1610 represents an intermediate lighting and response level and these pixel locations would be reset to the double slope level 1613 by the reset pulse at the time of the double-slope reset pulse 1612. Curve 1611 had reached saturation 1604 prior to the time of the double slope reset pulse and is likewise reset to the doubles slope level by the reset pulse. The curve is shown offset along the X-axis from the other curve 1610 for visualization purposes only, the pixels represented by 1610 and 1611 would both be rest at the same reset time 1612. Integration continues for all curves until the read-out time 1606. The double slope procedure extends the dynamic range since previously saturated pixels now will not saturate. In a preferred embodiment, a minimum required contrast model is used to select the camera control parameters of integration time (T), double slope time ($T_{d-s}$) and the double slope reset voltage ($V_{d-s}$). In the case of reading characters on a license plate, the contrast model ensures that camera control parameters are selected to provide sufficient contrast for the image of the plate to enable character recognition for both the alphanumeric plate number as well as the state identification. The camera parameters are selected to provide sufficient contrast to noise ratio as defined as:

Contrast/noise ratio=|Pixel count of character−Pixel count of background|/Noise (19)

Where the pixel count of character is the digital output of the camera for regions of the acquired license plate image occupied by characters, either numeric characters of the plate number or the script characters of the state identification. Pixel count of the background is the digital output of the camera for the background regions of the license plate. Noise is the total noise arising from the sensor and electronics already discussed above. In a first embodiment the image contrast to noise ratio is adjusted through control of the three parameters, T, $T_{d-s}$ and $V_{d-s}$ using only external environmental factors to select values for the parameters is one of the novel features of the invention. In another embodiment the camera further has the ability to adjust the gain of the amplifier 104 (FIG. 1). In this embodiment the gain is raised just sufficiently to enable a sufficiently short integration time T. T must be short enough to provide a blur free image for character recognition. Raising the amplifier gain also raises the noise therefore the gain is set just sufficiently high to enable the required fast integration time.

Figure 17:
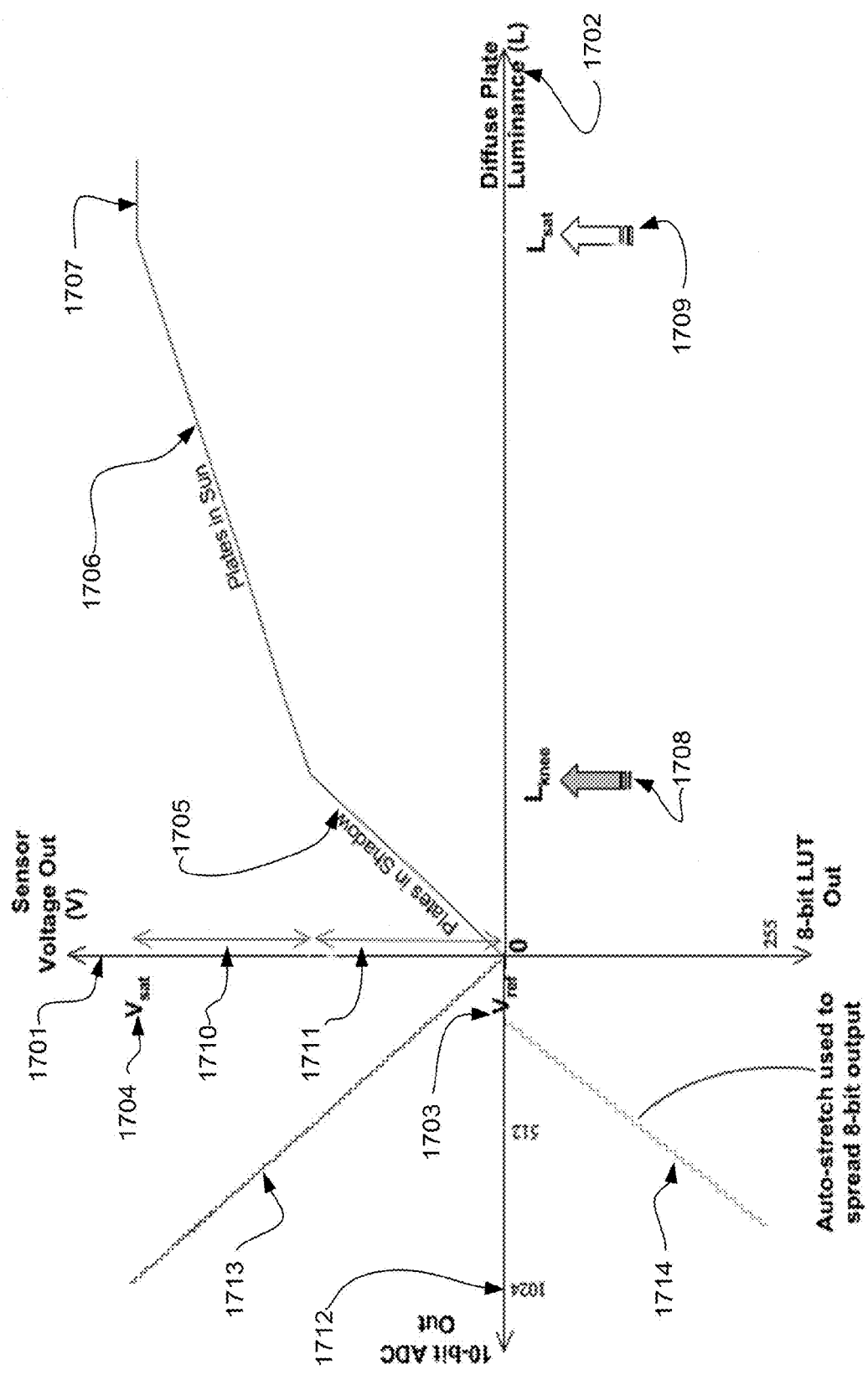
FIG. 17 shows the pixel output voltage versus luminance and a contrast control algorithm embodiment of the invention.

Referring now to FIG. 17, the double-slope concept is applied to the license plate imaging. The sensor response and plate luminance are shown along the y-axis 1701 and x-axis 1702 respectively. The sensor response, ranging from the reset reference voltage $V_{ref}$ 1703 to the saturation voltage $V_{sat}$ 1704, is divided into two regions one for plates in the shade 1711 and a second region for plates located in the sun 1710. The luminance shown along the x-axis 1702 defines boundaries for these regions at $L_{knee}$ 1708 and at $L_{sat}$ 1709. $L_{knee}$ is the maximum possible white plate diffuse irradiance for a plate illuminated solely by diffuse irradiance from the road and diffuse irradiance from the sky i.e. shaded. $L_{sat}$ is the peak irradiance from a plate. The control system results in an output voltage ranging from $V_{ref}$ 1703 the reset value for an imaging interval and $V_{sat}$ 1704 the voltage for a saturated sensor. The slope for the plates in the shade 1705 is greater than the slope for the region where plates would be illuminated in the sun 1706. This results in enhanced contrast and therefore ability to recognize characters on plates in the more difficult shaded situations. This sacrifices somewhat the contrast for the plates in the sun. However a sunlit plate typically has more than adequate contrast for readability. In one embodiment the sensor parameters are selected such that ½ of the dynamic range of the sensor output is allocated to the radiance of plates in the shade 1711 and ½ of the dynamic range of the sensor is allocated to the radiance of plates in the sun 1710. The allocation of the dynamic range is dependent upon the object to be imaged. The inventor has found that for license plates the allocation as provided enables character recognition across a wide range of environmental lighting conditions. In another embodiment the primary target of the image may be consistently shadowed and the dynamic range is allocated to provide more data on the low luminance portion of the image. In another embodiment the allocation of dynamic range may be weighted to the high luminance portion of the image.

The output of the A to D converter is shown in the negative x-axis region of FIG. 17. The 10 bit output of the A to D 1713 ranges from 0 to 1023. This is mapped by an auto-stretch embodiment of the invention, discussed below in conjunction with FIG. 18, to an 8 bit output 1714. Mapping of the 10 bit output of the A to D to the ultimate 8 bit output of the camera allows correction for camera and sensor discrepancies such as dead pixels and A/D channel imbalance.

Figure 18:
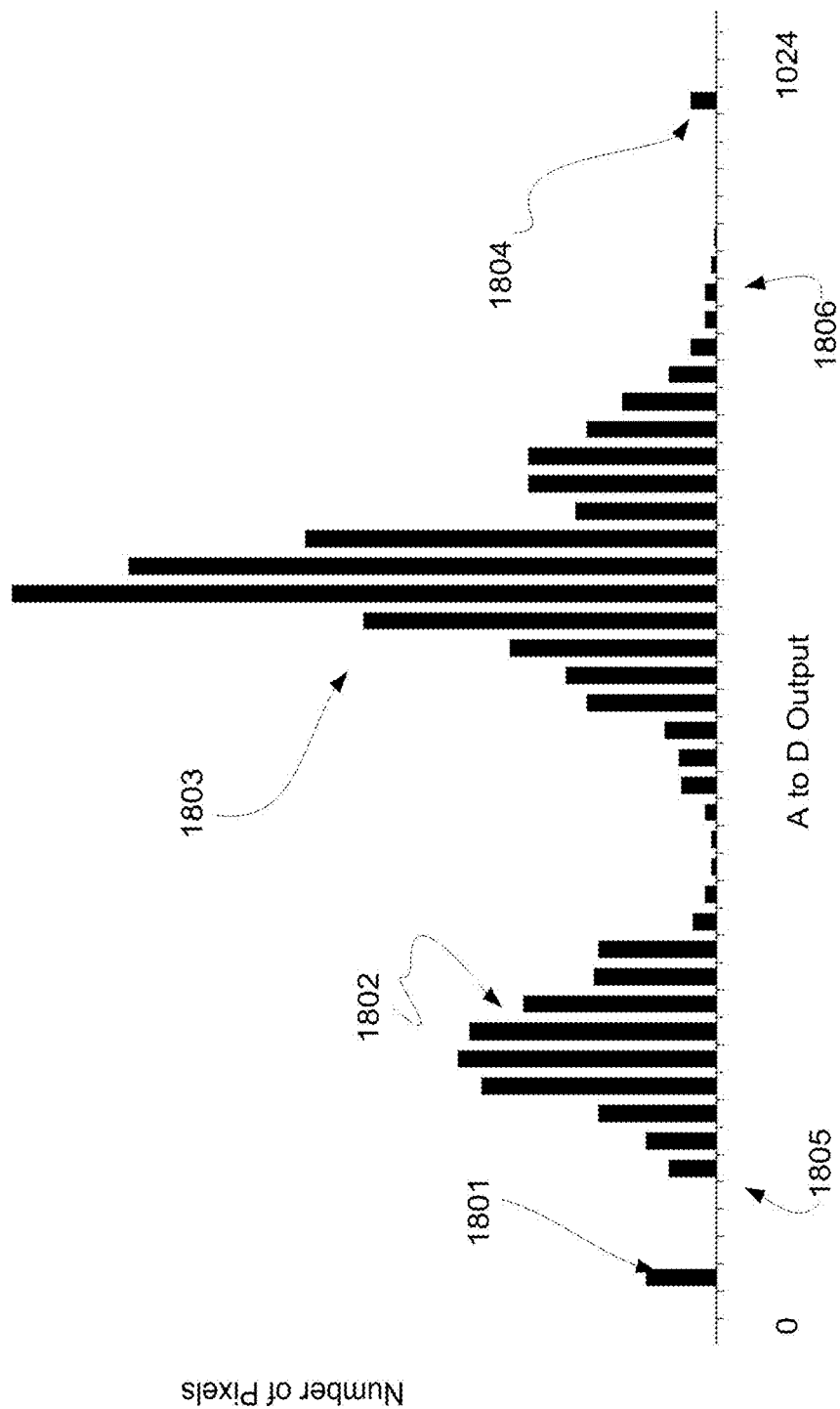
FIG. 18 shows depicts an image histogram used in a contrast control embodiment.

FIG. 18 depicts a histogram of the 10 bit output of the A/D. in one embodiment a mapping algorithm applies a filter algorithm to adjust for errors, defects and noise in the 10 bit image. The histograms of real images vary continuously. Counts of pixels at low A to D output 1802 correspond to dark regions of the license plate image and counts of pixels at high A to D output 1803 correspond to the white background areas of the plate. In another embodiment an observed collapse of these two regions 1802, 1803 into a single histogram feature (not shown) is indicative of the need to turn on external lighting. Discontinuities within the histogram are an indicator of non-valid data points arising from defective pixels or noise. The algorithm searches from the low end of the histogram until it encounters a smoothly changing portion of the histogram. Isolated discontinuities or non-valid data points, such as 1801, are ignored. Similarly discontinuities at the high end of the histogram are also an indicator of non-valid data points arising from sensor defects or noise. In the exemplary histogram of FIG. 18 the discontinuity or non-valid data point at the high end of the A to D output 1804 would also be ignored or effectively filtered out. The mapping algorithm then scales the digital image by mapping the point 1805 to 0 and the point 1806 to 255. Thereby the regions of the data containing real image data are retained and scaled to cover the full dynamic range of the output while regions containing non-valid data points arising from noise or errors are rejected. This ensures all the useful data of the image and the full 8-bit dynamic range is retained while rejecting errors and noise. In another embodiment the output of multiple ADC's are separately filtered and mapped to the 8 bit output. The mapped data may then be combined. The scaling of the endpoints will scale the output of each ADC to the same range. Mismatched ADC's or channel imbalance is thereby accounted for and corrected. In another embodiment as lighting decreases the sensor output may not reach saturation. Typically the total integration time (T) is selected such that the white plate background is just at saturation. However the integration time (T) is also limited by the high-speed nature of the image. The mapping of the histogram points will ensure that the output covers the full 8-bit dynamic range even when the lighting is too low to reach saturation. The mapping is not restricted to a map of 10 bit to 8 bit. In another embodiment the mapping may be from a 10 bit ADC output to a 10 bit scaled output. Intermediate points may be calculated using for example a nearest neighbor, linear, bilinear, cubic or bicubic or similar algorithms as are known in the art.

Algebraically, the output of the sensor is given as follows:

$$I = \min[\Delta V_{pixel} + V_{ref} - V_{blk}), V_{sat}]*1023/(V_{wht} - V_{blk}) \quad (20)$$

$$= k_1 * L * T \quad (21)$$

$$= 512/(k_1 * T) \text{ for } 0 \le L \le L_{knee}$$

$$= \min[(k_2 * L - L_{knee}) * T_{ds} + 512, 1023] \quad (22)$$

$$= 512/(k_2 * T_{ds}) + L_{knee}, \text{ for } L_{knee} \le L \le L_{sat}$$

where
$\Delta v_{pixel}$=license plate voltage change=$k_0*L*T$
$V_{ref}$=black level
$V_{wht}$ & $V_{blk}$=A to D converter settings
$V_{sat}$=sensor saturation voltage
$k_1$=$k_0*1023$ (for a 10 bit A to D output)
$k_2$=slope of the count versus luminance curve after the reset
$k_0$ and $k_1$ and $k_2$ are calibration factors for the sensor.

Ideally $k_1$=$k_2$, however in practice it has been found that the response does not necessarily follow this ideal and therefore both parameters $k_1$ and $k_2$ are required for some camera systems.

The control solution is calculated as follows:

$$T=(V_{knee}-V_{ref})(k_1*L_{knee}) \quad (23)$$

$$T_{d-s}=(V_{sat}-V_{knee})(k_2*(L_{sat}-L_{knee})) \quad (24)$$

$$V_{d-s}=V_{knee}-k_2*T_{d-s}*L_{knee} \quad (25)$$

Or in terms of the A to D output:

$$T=512/(k_1*L_{knee}) \qquad (26)$$

$$T_{d-s}=512*k_1*T/(k_2*(k_1*L_{sat}*T-512)) \qquad (27)$$

$$V_{d-s}=512*(1-(k_2/k_1)*T_{d-s}/T) \qquad (28)$$

The factor of 512 reflects the fact that ½ of the dynamic range of the 10 bit A to D is allocated to the region of luminescence below the knee or shaded license plates and ½ of the dynamic range is allocated to the region above the knee or radiance indicative of a non-shaded brightly lit license plate. The allocation of the dynamic range is dependent upon the object to be imaged. The inventor has found that for license plates the allocation as provided enables character recognition across a wide range of environmental lighting conditions. In another embodiment the primary target of the image may be consistently shadowed and the dynamic range is allocated to provide more data on the low luminance portion of the image. In another embodiment the allocation of dynamic range may be weighted to the high luminance portion of the image. In a preferred embodiment the distribution of the dynamic range is done to meet minimum contrast requirements for recognition of features in the image across the entire range of luminance values. The transfer function of the imaging system is defined by the camera response and the control system parameters. In the preferred embodiment the minimum requirements for a transfer function is first determined on the basis of contrast requirements between objects in the image. The minimum required transfer function is then used to calculate the control parameters for the imaging system. That is in the embodiment described above the allocation of the transfer function to different portions of the imaging exposure space is done empirically. In the mode described later the allocation is done algorithmically on the basis of the contrast requirement between features of interest in the image.

Figure 19:
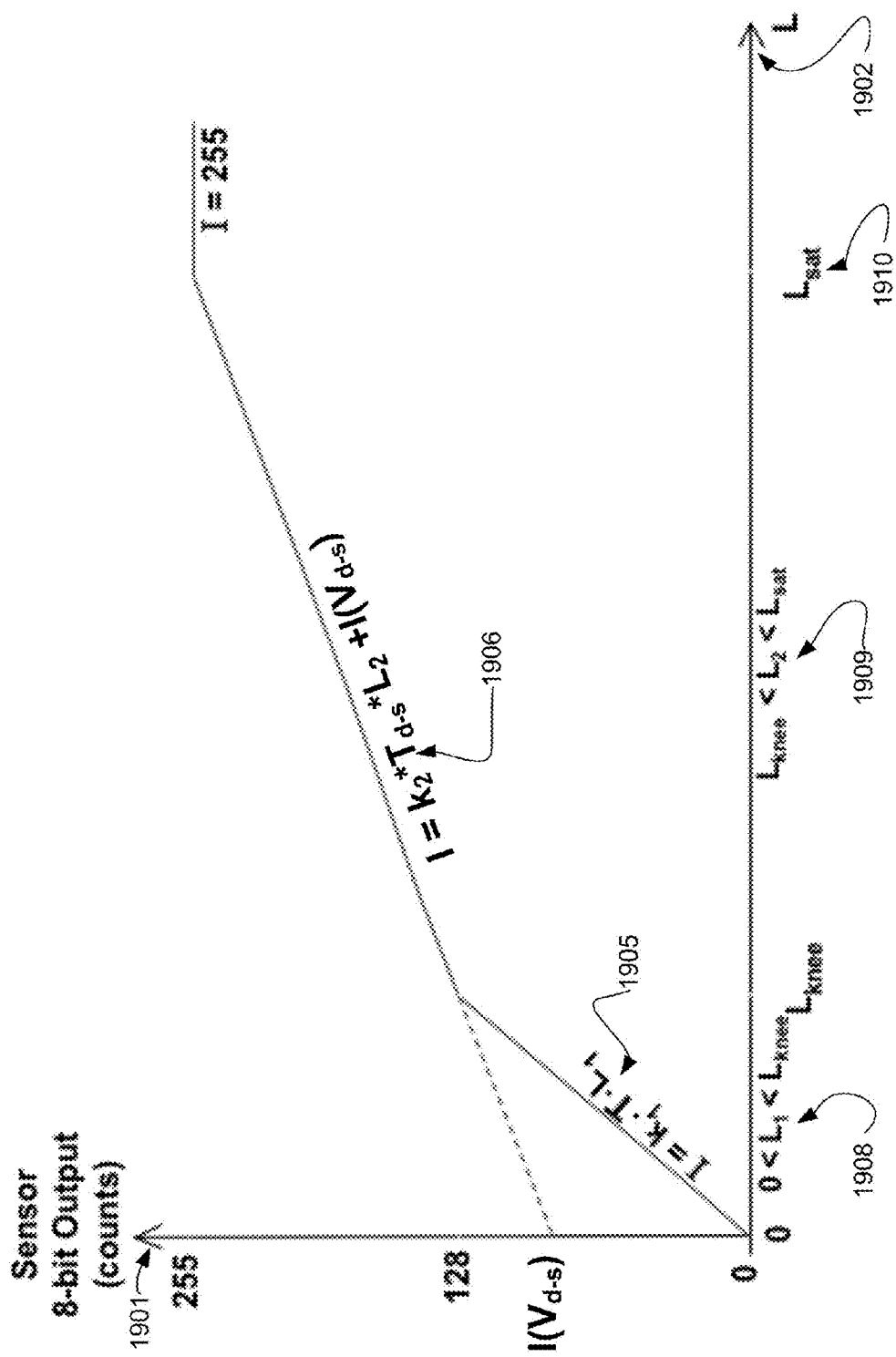
FIG. 19 shows sensor output in 8 bit counts versus luminance and the contrast control algorithm embodiment factors.

The control algorithm embodiment of the invention is further exemplified in the resultant transfer function depicted in FIG. 19. The 8 bit output of the sensor is shown on the y-axis 1901 and the luminous radiance of the plate is shown on the x-axis 1902. The factors k1 and k2 are sensor specific calibration factors. During daytime hours estimates of the sun, sky and road irradiance, coupled with properties of the plate produce estimates of the plate radiance. These estimates are used to select $L_{knee}$ and $L_{sat}$. For radiance less than $L_{knee}$ 1908 the 8 bit output is given by:

$$I=k_1*T*L_1 \qquad (29)$$

Where T is the integration time and $L_1$ is the radiance of the plate background in this range. For radiance above $L_{knee}$ yet below saturation 1909, the 8 bit output is given by:

$$I=k_2*T_{d-s}*L_2+I(V_{d-s}) \qquad (30)$$

where $T_{d-s}$ is the double slope integration time and $L_2$ is the radiance of the plate in this range of luminance and $I(V_{d-s})$ is the selected 8 bit output at the double slope reset voltage. At saturation the Luminance 1910 corresponds to a maximum 8 bit output of 255. The highest irradiance on the plate occurs in a partly cloudy sky where both direct beam and re-reflected diffuse sky irradiance and road irradiance illuminate the plate. The contrast control algorithm sets $L_{knee}$ to the minimum expected white plate luminance caused by clear sky diffuse irradiance, reduced by a factor to account for the nearby structures blocking the plate's view of the sky, and road reflection of the clear sky irradiance with an accounting for shadows cast onto the road by the vehicle and nearby structures. The contrast control algorithm sets $L_{sat}$ to the maximum expected white plate excitance caused by direct sun-beam and partly cloudy sky diffuse irradiance, again reduced by a factor to account for nearby structures blocking the plate's view of the sky and the road reflection of a partly cloudy sky diffuse irradiance, with accounting for shadows cast onto the road surface by nearby structures.

Figure 20:
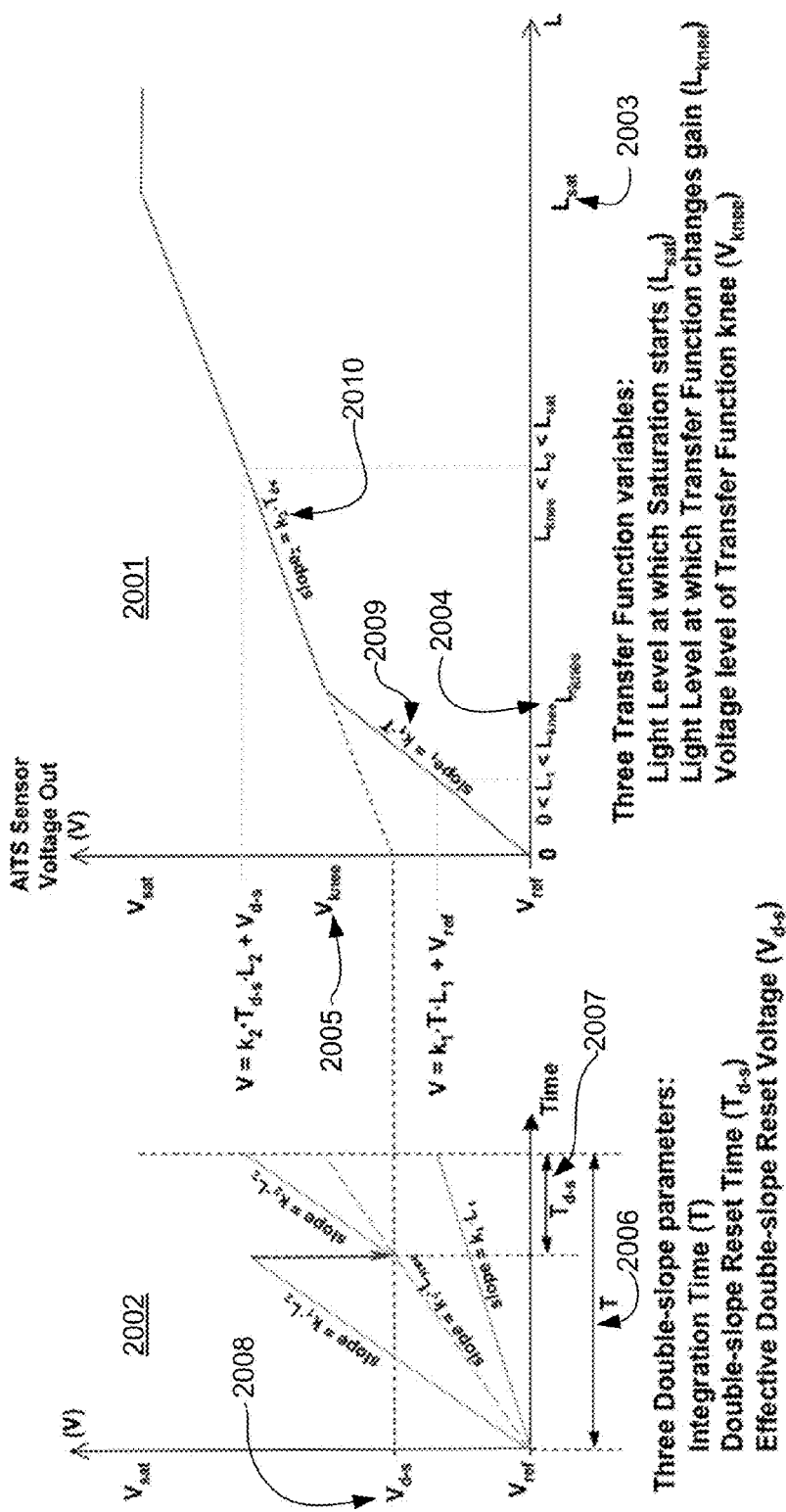
FIG. 20 shows a graph of sensor output voltage and luminance and a second graph of sensor voltage output versus integration time and a mapping between the two of factors related to a contrast control algorithm embodiment.
Figure 23:
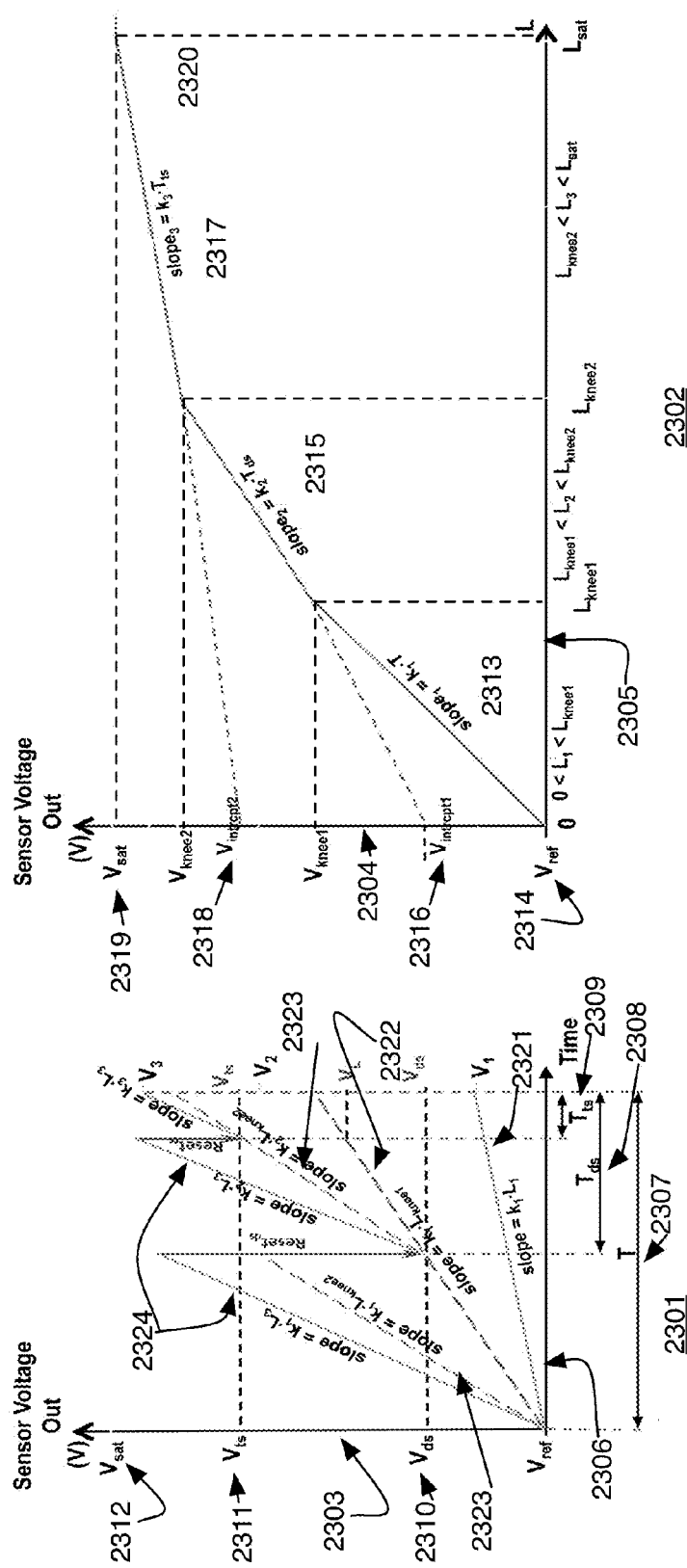
FIG. 23 shows the relation between the control parameters and the resultant stepwise linear transfer function.

FIG. 20 depicts the relation of the camera transfer function to the double slope parameters. The camera transfer function 2001 variables of light level at saturation ($L_{sat}$) 2003, light level at which the transfer function changes gain ($L_{knee}$) 2004 and voltage level of the transfer function at $L_{knee}$ ($V_{knee}$) 2005 map to the three double slope parameters of integration time (T) 2006, double slope reset time ($T_{d-s}$) 2007 and the effective double slope reset voltage ($V_{d-s}$) 2008 as shown in the graphical relation of voltage versus measurement time 2002. The formula for T, $T_{d-s}$ and $V_{d-s}$ of equations 22, 23 and 24 respectively apply. In the region below $L_{knee}$ 2009 the slope of the voltage versus luminance curve is $k_1*T$. In the region above $L_{knee}$ 2010, the slope of the curve is $k_2*T_{d-s}$. The camera transfer function is similarly related to control parameters where there two, three and more reset voltages coupled with the corresponding reset times included in the camera control parameters. The camera control parameters 2002 result in a piecewise linear transfer function 2001. FIG. 23 shows an equivalent set of images as FIG. 20 but for a camera control system that includes two reset voltages Because the contrast control embodiment is based upon an integration time, an intermediate reset time and an intermediate reset voltage. The algorithm must account for the timing requirements of data sampling and integration in the context of the camera processor. In one embodiment the calculated values for T and Td-s are adjusted for processing delays in the camera electronics.

Nighttime Control

Figure 22:
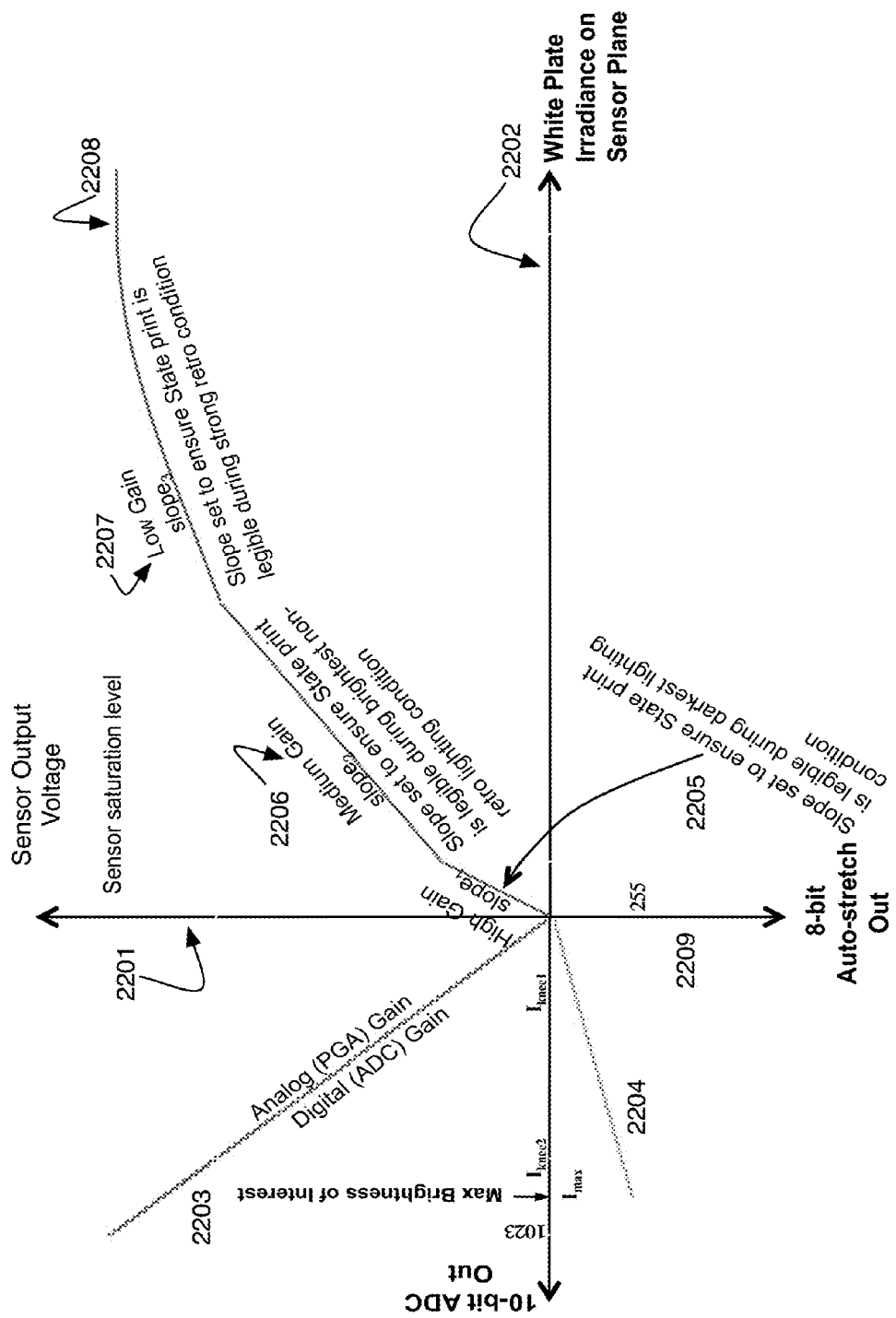
FIG. 22 is a graph showing sensor voltage output versus luminance and factors related to worst case contrast requirements for imaging.

In another embodiment, as the $L_{sat}$ of FIG. 22 approaches $L_{knee}$ there is seen a need for additional lighting. In one embodiment external artificial lighting is turned on when $L_{sat}$ approaches $L_{knee}$.

In another embodiment the histogram of FIG. 18 is used to trigger the need for external lighting. When the points 1805 approach 1806 the lighting is not sufficient to provide the required contrast and an external lighting circuit is activated. In another embodiment an external sensor is used to indicate nighttime or other inadequate lighting condition. The control parameters for the camera in a nighttime setting are dependent upon the lighting used and the arrangement of the camera with respect to the lighting and the license plate. The parameters of T, $T_{d-s}$ and $V_{d-s}$ are empirically determined. The integration time (T) is selected based upon the high speed imaging requirements for a non-blurred image. $T_{d-s}$ and $V_{d-s}$ are calculated as described above to allocate the dynamic range of the camera. In a preferred embodiment the dynamic range is allocated to equally to a high luminance region and to a low luminance region and T, $T_{d-s}$ and $V_{d-s}$ are not varied through while artificially illuminated is used. In another embodiment the gain of the camera is adjusted to enable sufficiently short integration time (T).

Exposure Settings for Minimum Contrast Across all Lighting Conditions

The inventor has found that for many situations the double slope control algorithm as described above is not sufficient to provide the contrast required to recognize the characters of a license plate. There is a need for additional regions for control of the image exposure settings. In the preferred embodiment the minimum contrast ratio for identification of the most difficult image feature on the plate is maintained across the entire spectrum from low light conditions to retro-reflectance. In the example discussed the worst case image feature is the state identification is small (~1 pixel in width at the image sensor) and printed in a lower contrast color such as a primary color. The signal to noise requirement is 10:1 for an accuracy of detecting the feature at approximately 100%. The procedure described below for a general transfer function uses these criteria. The same procedure can be used to detect features that are larger than 1 pixel and/or have a reflectance larger than ⅓ of the background radiance and where the accuracy criteria is less than 100%. Where the control algorithm described above uses three parameters (T, $T_{d-s}$ and $V_{d-s}$) to define two exposure regions, new control algorithms have been added to define, 3, 4 and n exposure regions. The exposure control regime is described in terms of the transfer function of the image sensor. The transfer function, as is known in the art, is the output voltage or counts (after an A/D) of the sensor as a function of the input radiance. The same models as already described to define the radiance as a function of latitude, longitude, altitude, date, atmospheric conditions and shadowing are applied along with new embodiments of camera control to define the transfer function of the sensor that enables improved contrast and increased accuracy in character recognition.

Referring now to FIG. 22, a triple slope transfer function is shown. The triple slope means that there are three different gains used in the course of acquiring a single image. The Y-axis shows the output of the image sensor and the x-axis 2202 shows the irradiance of the plate as seen at the sensor or image plane of the camera. Also shown are the scaling functions for the output. Where the gains is set for the 10-bit analog to digital converter such that the range of output from no light to saturation ranges from 0 to 1023 counts as is shown in the graph 2203. In one embodiment the 10 bit output is scaled to an 8 bit output 2204 with a range of 0 to 255 counts for the same range of irradiance detected at the sensor. The graph is such that the negative x-axis corresponds to the output of the 10 bit A-D and the negative y-axis 2209 corresponds to the output of the 8 bit A-D. The camera control algorithm controls 3 levels of gain as determined by integration time and amplifier gain. The first region 2205 has a high gain set for plates that are imaged under heavy overcast skies or at times when auxiliary light s are required, such as at night. The second region 2206 a medium gain and medium slope in the transfer function corresponds to brighter light conditions then that in the first region 2205. The second region 2206 corresponds to conditions where the plate could be under a patchy cloudy sky, perhaps with some direct sun on the plate and conditions where an auxiliary light is one but the light brightness and location of the plate is such that the plate irradiance as seen at the image plane is brighter than that in the first region 2205. The third region 2207 corresponds to the lowest gain is set for conditions of retro-reflectance from either the sun or auxiliary lighting. The flat region 2208 corresponds to saturation of the sensor. In the preferred embodiment the slope of the transfer function is chosen to enable recognition of the "state" identification on the license plate. In many observed cases the contrast between the state identification and the plate background is lower and the size of the characters used to identify the state is smaller. This often makes the identification of the state the more difficult imaging task. In the preferred embodiment the camera parameters are selected such that the state identification is legible in the lowest of lighting conditions in the first region 2205. The camera parameters are selected such that the state identification is legible during non-retro-reflectance conditions in the second region 2206. The camera control parameters are selected such that the resulting transfer function results in legible state identification even under retro-reflectance conditions in the third region 2207. Focusing on legibility of the state identification has been found in the preferred embodiment to automatically take care of legibility of the other higher contrast characters on the license plate.

FIG. 23 depicts the relationships between the camera control parameters and the transfer function for a triple-slope embodiment. The left hand graph 2301 shows the camera control scheme and the right hand graph 2302 depicts the resultant transfer function. The x axis in the left hand chart corresponds to time and in particular time during the acquisition of an image. The x-axis 2305 in the right hand chart 2302 corresponds to irradiance of the image at the image sensor. The Y axes 2303, 2304 in both charts correspond to sensor output voltages. The camera transfer function shown in the right hand chart 2302 is a piecewise linear approximation to an idealized camera and sensor where the imaging sensor parameters could be changed continuously and instantaneously through the image acquisition process.

The transfer function is as discussed in the previous slides is comprised of a first region 2313 where parameters are set for low light conditions, a second region 2315 where camera control parameters are set for medium lighting conditions and a region 2317 for most intense lighting conditions. The region 2320 corresponds to saturation of the sensor.

The control scheme where the luminance is divided into three zones is comprised of six parameters: The total integration time for the image acquisition, Integration Time (T) 2307, the Double-slope Reset Time (Tds) 2308, the Triple-slope Reset Time (Tts), 2309, the Double-slope Reset Voltage (Vds) 2310, the Triple-slope Reset Voltage (Vts) 2311 and the Saturation Voltage level (Vsat) 2312. The various subscripted "L" parameters are irradiance values and the "K" parameters are calibration constants for the imaging system that determine the output voltage as a function of the specific sensor, filters and lenses used during image acquisition. The K parameters are determined empirically through calibration of the camera as discussed below. The irradiance values, $L_1$, $L_2$, and $L_3$ are assumed to be constant over integration times T, $T_{ds}$ and $T_{ts}$. The control scheme is defined by determining the anticipated irradiance values L1, L2 and L3 from the solar irradiance, shadowing and imaging models as discussed above. Calibrating the imaging sensor determines the "$k_i$" values and then solving for the six control parameters 2307-2312.

The five control parameters given by Equations 31-35 plus the sensor voltage at saturations $V_{sat}$ are used to control the camera/sensor during image acquisition.

$$T = (V_{Knee1} - V_{ref})/k_1 * L_{Knee1} \quad (31)$$

$$T_{ds} = (V_{knee2} - V_{knee1})/k_2 * (L_{knee2} - L_{knee1}) \quad (32)$$

$$V_{ds} = V_{knee1} - k_2 * T_{ds} * L_{knee1} \quad (33)$$

$$T_{ts} = (V_{sat} - V_{knee2})/k_3 * (L_{sat} - L_{knee2}) \quad (34)$$

$$V_{ts} = V_{knee2} - k_3 * T_{ds} * L_{knee2} \quad (35)$$

Where:
T=total integration time,
$T_{ds}$=Double slope reset time
$T_{ts}$=triple slope reset time
$V_{ds}$=Effective double slope reset voltage
$V_{ts}$=Effective triple slope reset voltage $V_{sat}$=saturation voltage.

$k_i$=Calibration factors for the imaging system that relate luminance input to sensor voltage out.

The total integration time is also limited by requirements of minimizing motion blur since the license plates are on a moving vehicle and optimization for low light and saturation conditions. All are discussed below.

In practice the control scheme is shown by three curves 2321, 2322, 2323 shown in FIG. 23. The curves represent the response curves for pixels that are in four different regions of the image ranging from low to medium and high intensity light conditions respectively. The response curves for these light intensities are a function of the imaging optics and sensor. In the example of FIG. 23 the response constants for the sensor ($k_1$, $k_2$, $k_3$) are different for low, intermediate and bright luminance from the plate reaching the sensor. The values for the slopes/response constants $k_i$ are determined empirically through calibration of the optical system. Since the constants are determined by calibration of the imaging system other embodiments will have all of the $k_i$'s equal. The curve 2321 for pixels at low light follows a single response curve for the entire exposure time, T. The sensors corresponding to these pixels never reach saturation and never exceed $V_{ds}$, $V_{ts}$ and $V_{sat}$. The curve 2322, 2323 for sensors that are in intermediate light conditions follow several curves depending upon the intensity of the light at their location. In the first case 2322 the intensity of light is such that at the double slope reset time ($T_{ds}$) the voltage is less than or equal to the double slope reset voltage $V_{ds}$ the response such that the response continues along curve 2322 at the same initial gain similar to the case of the low intensity curve 2321. If the light intensity is such that the voltage at time $T_{ds}$ exceeds $V_{ds}$ then the voltage is reset to $V_{ds}$ at time $T_{ds}$ and the response continues along the third curve 2323. After the reset at time $T_{ds}$ the response curve for the pixels receiving this light intensity is determined by the intermediate calibration constant $k_2$ for the remainder of the acquisition time after $T_{ds}$. At the triple slope reset time $T_{ts}$ the voltage for these sensors exceeds $V_{ds}$ but is less than $V_{ts}$ and the response remains at the intermediate level continuing to follow the curve 2323. The Pixels in the most intense regions of the image are those where there may be for example retro-reflective light from either the sun or artificial lighting. Here the response for these pixels follow the fourth curve 2324. At the beginning of the exposure the voltage quickly exceeds $V_{ds}$ and the voltage is reset to $V_{ds}$ at time $T_{ds}$. At time Tds the gain is reduced for these sensors in the time between $T_{ds}$ and $T_{ts}$. At the triple slope reset time, the voltage for these sensors is seen to now exceed the triple slope reset voltage $V_{ts}$ and the voltage is reset to $V_{ts}$ and integration then continues for the remaining duration of the exposure ($T_{ts}$). The control scheme 2301 determines the transfer function 2302. The control scheme allocates bandwidth to the various exposure regions. This is done through the selection of the integration times and the reset voltages. In previous embodiments the allocation of the bandwidth of the system was allocated empirically. In some imaging situations the bandwidth was allocated equally between high intensity imaging situations and low intensity imaging situations. In other cases if the luminance calculations indicate that there will be primarily plates in high luminance situations more bandwidth is allocated to the high luminance situations. The allocation is done on the basis of setting the integration times (T's) and the reset voltages (V's) of the left hand control graph 2301 of FIG. 23. In the embodiments that follow the allocation is done algorithmically based upon the minimum contrast requirement calculated above. Note that the minimum contrast arose from the irradiance models and calculation done a priori.

Minimum Contrast Requirement

Figure 21:
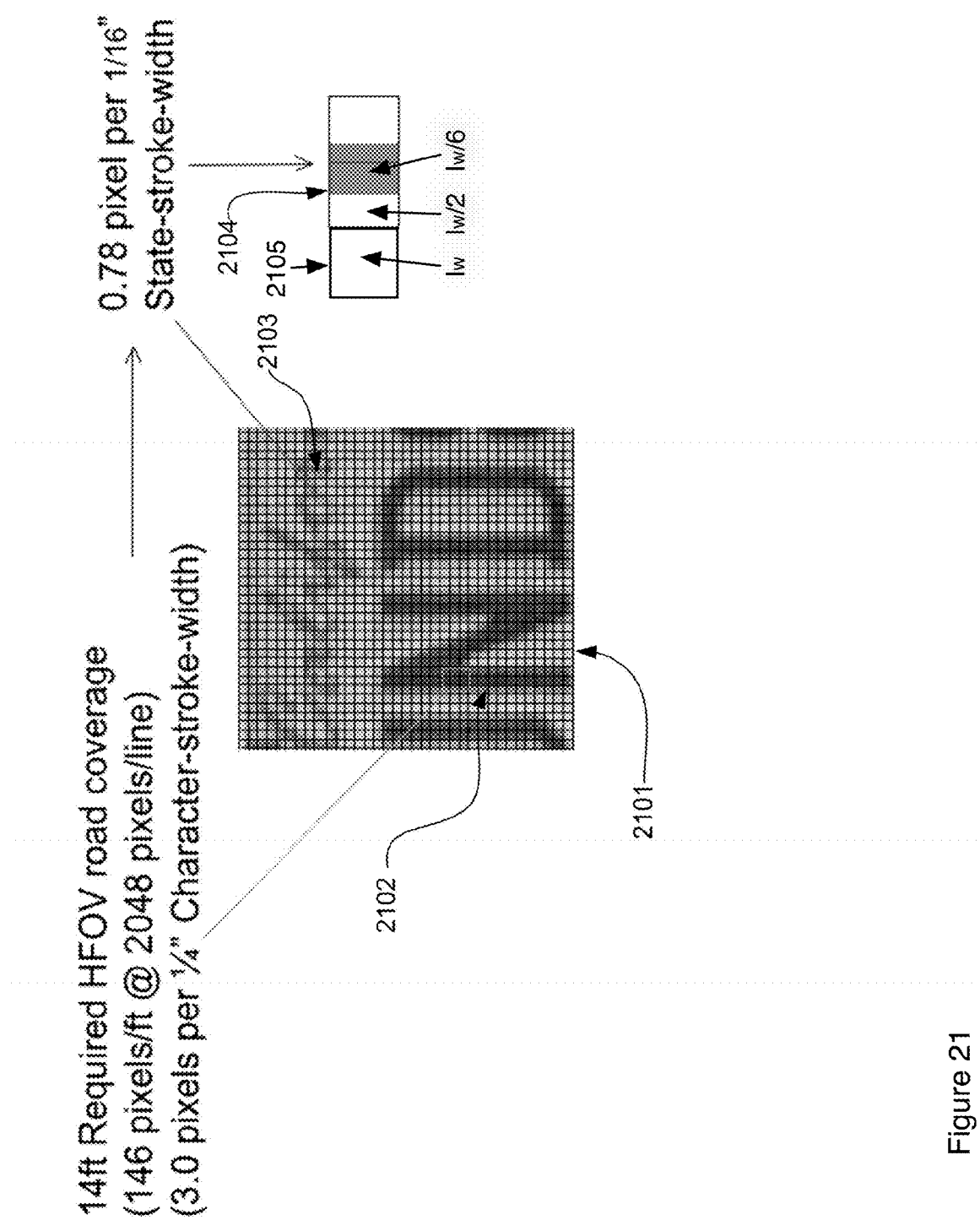
FIG. 21 shows an exemplary acquired image and factors affecting contrast control and imaging requirements.

Combining the results and discussion of FIGS. 21 through 23 a general formula for the camera control parameters Ti's, Vi's and total integration time T can be determined that will meet the requirement for a minimum contrast throughout the luminance range from minimal lighting to retro reflection. The camera control scheme in general terms is to begin integration, charge is acquired at each pixel location as a function of the impinging light. At time Ti after start of the image acquisition those pixel locations with a charge greater than Vi volts are reset to Vi and data acquisition continues. This process continues with reset to Vi at each of the Ti until the end of the total integration time T. The task for determining the control scheme is therefore to determine the Ti's and Vi's that will give an image that meets the minimum contrast requirement across the entire range of luminance impinging on the image sensor. A minimum required signal for the background luminance was determined above and shown in equation (33). Using that result we now to determine the response function as a piecewise linear response across the entire range of lighting from low lighting, through fright daylight and up to retro reflection of the sun reflected off the object directly into the imaging system.

FIG. 21 depicts a method for estimating the minimum required contrast in an image. The example is for an image of a typical license plate. The same method would apply to any image where there is some feature that is to be detected and recognized on a background and for which the luminance of the feature and the background can be calculated. The section of the plate image 2101 includes the alphanumeric text 2102 of a license plate number and the script text 2103 of the state identification. In order to capture the image of a license plate on a road a 14 foot field of view is required. For a sensor with 2048 pixels per line there will be 146 pixels per foot or 3 pixels will cover the typical ¼ inch stroke width of the alphanumeric plate number. The more demanding imaging problem is the state identification. Typically the state-stroke width 2104 is only $\frac{1}{16}$" wide. For the exemplar field of view and camera resolution there is an 85% probability of the state-stroke filling 50% or more of a pixel. The radiance of the state-stroke in the instant case is ⅓ the radiance of the background. In the example the state-stroke is red and the plate background white. The contrast is the difference between neighboring pixels. In FIG. 21 the white pixel 2105 has an irradiance $I_w$ or that of the white background. The neighboring pixel 2104 is ½ white background and ½ the color of the feature of interest. In this case the red lettering on the license plate. The irradiance of the white portion of the second pixel is therefore $I_w/2$ and the irradiance of the red right hand side of the second pixel 2104 is $I_w/6$. The latter value is calculated as the fraction of the pixel that is covered by the character (½) times the irradiance of the character ($I_w/3$ in the example case). The contrast is the difference in Irradiance of the neighboring pixels or $I_w-(I_w/2+I_w/6)=I_w/3$.

The example case requires recognition of the lettering by both machine vision and human vision. The latter is required since a human may be required to confirm the automated character recognition. Human and the automated software for identification typically require a contrast to noise ratio ($\Delta/2\sigma$) of ≥5 for 100% accurate detection of an object in an image. This is known in the art as the "Rose criterion". In the example the typical noise was determined empirically to be $\sigma=1.2$ (8 bit) counts, this implies need a contrast or difference in counts between the stroke and the background of $\Delta \geq 12$. The requirement is $\Delta \geq 12$ between the full background pixels and the pixels 50% filled by the state-stroke over all lighting conditions including sun retro-reflection. Using the calculated contrast difference between neighboring pixels of $I_w/3$ implies that $I_w/3>12$ or that the exposure parameters for the camera must be set such that $I_w \geq 36$ (8 bit counts) or 144 ten bit counts. This calculation is an example of estimating the required contrast and therefore the required form of the transfer function for any imaging situation.

In general terms the calculation is as follows:
Where:
$L_w$=Luminance of the background
$L_f$=Luminance of the feature of interest
F=fractional area of a pixel that the feature of interest fills with the remainder of that pixel being background
$s/n_{req}$=signal to noise ratio required for character recognition
$\sigma$=characteristic noise of the imaging system First calculate the contrast between a background pixel 2105 and the pixel 2104 including the feature of interest:

$$\Delta = L_w - ((1-F)*L_w + F*L_f) \quad (31)$$

$L_w$ is the Luminance at the first background pixel(s) 2105. The Luminance at the neighboring feature of interest pixel(s), is the sum of the luminance of the portion of the pixel that is covered by background $((1-F)*L_w)$ (labeled $I_w/2$ in the example FIG. 21) and the portion of the pixel (labeled $I_w/6$ in FIG. 21) that is covered by the feature of interest $F*L_f$. The values for $L_w$ and $L_f$ are determined on the basis of the material properties of the background and feature and the lighting model all already discussed. Therefore the ratio $R_{fw}=L_f/L_w$ is a known quantity.

$\Delta$ is the signal of interest or contrast. G is the characteristic noise of the imaging system.

The signal to noise required for the particular system is set equal to the contrast:

$$\Delta/\sigma = s/n_{req} \quad (32)$$

substituting for $\Delta$ one can then solve for the signal required for the given background radiance $L_w$ in this region 1 as:

$$\text{Signal required} = I_{required} = ((s/n_{req})*\sigma)/F*(1-R) \quad (33)$$

To obtain the minimum contrast the exposure setting are selected such that $L_w$ produces a signal in the imaging system for the background of the image that satisfies equation (33). The signal required is related to the exposure time through the image system response parameters from the calibration of the imaging system and the exposure time as shown in equation (29): $I_{required}=k_1*T_1*L_1$. Where $T_1$ is the minimum integration time and $L_1$ is the radiance of the radiance of the background in this illumination range.

If $\sigma$ is known in counts for the A/D output of the system then the required signal will have the same count units. In the specific example discussed above for a 1/16 inch red line feature on a white background of a license plate the signal required from the 10 bit output was seen to be 144 counts. The camera response curve from calibration of the imaging system gives the integration time required to produce 144 counts can be determined and therefore set the exposure setting. Calibration of the camera system means determining the output counts of the imaging system as a function of the irradiance hitting the camera sensor. The values for $s/n_{req}$, s, F and R are determined by the signal to noise requirements, the inherent noise in the imaging system, the relative luminance of the feature and the background and the size of the feature to be detected. Since all of the features are calculated a priori in the model presented above, the exposure setting required for minimum contrast can be set a priori.

The Luminance of the feature and the background however are not constant. The imaging system may be required to acquire images throughout the day and night. The angle of the sun with respect to the imaging system varies with time. These factors are determined up front using the models already discussed. The minimum contrast imaging parameters vary as the lighting varies. Therefore the piece wise linear transfer function is used to set the exposure depending upon time of day, relative angle of the sun, the object (in our example a license plate) and the image sensor and the other parameters already discussed. Equation 33 must be satisfied across the entire range of anticipated lighting/imaging conditions. The control scheme is to integrate the signal for a given time and then at the end of this time reset those the accumulated voltage to a selected reset value only for those pixel locations that exceed the reset value. The radiance at the reset time is defined as $L_{knee}$. For radiance above the knee and in subsequent segments the reset voltages and integration times are given by equations 31-35. The equations are shown for a three-segment control scheme. The same equations can be extended in the same manner to any number of control segments.

In another embodiment the required signal to noise is set by comparing results of automated character recognition in a database of images with known characters. In another embodiment the database consists of a database of license plate images where the characters on the plates have been confirmed.

Figure 24:
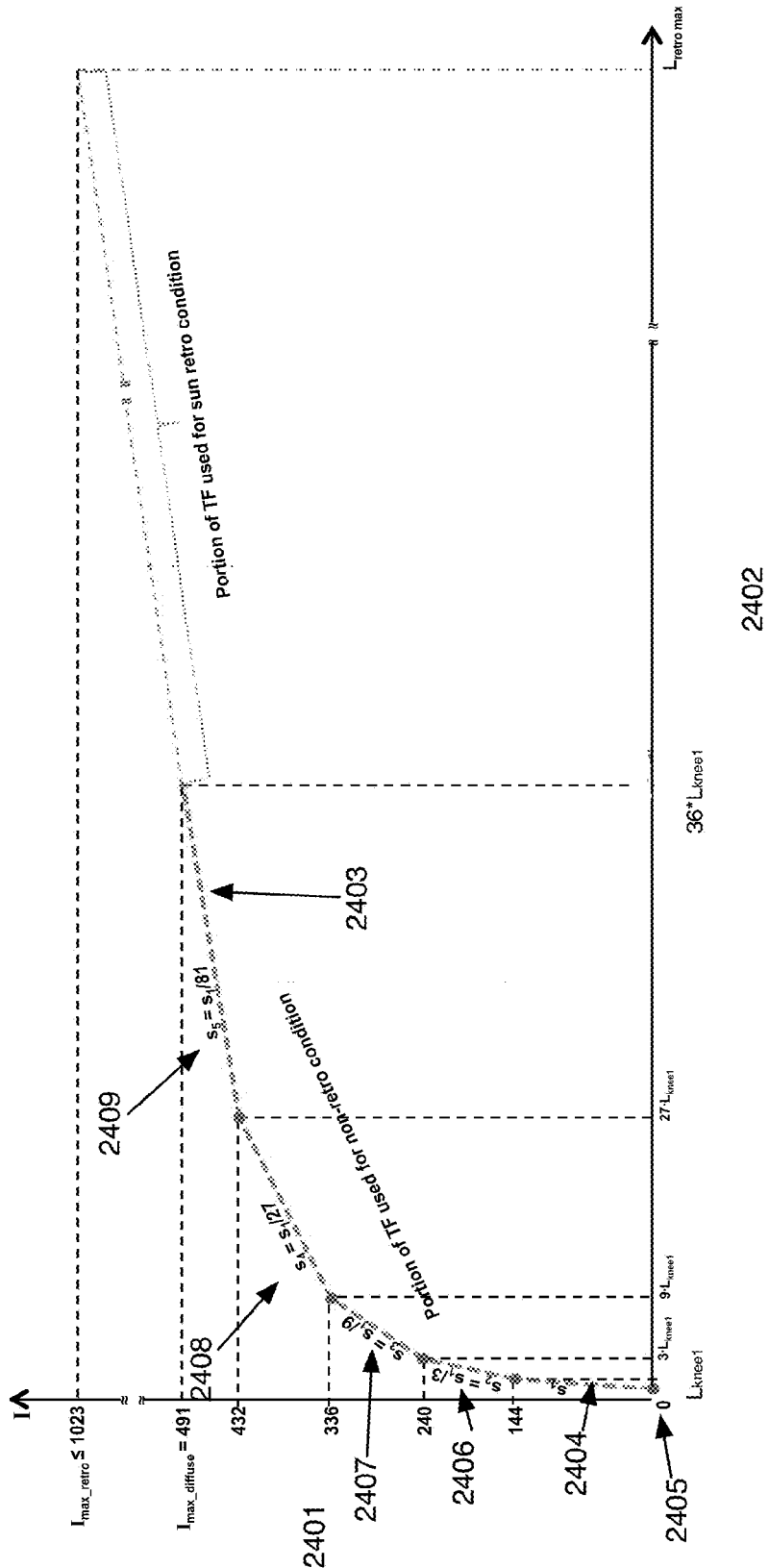
FIG. 24 shows a five segment transfer function.

Referring to FIG. 24 a 6 segment control scheme is shown. The control scheme is based upon the example of FIG. 21 where the object to be recognized is a license plate state identification character that has a luminance of ⅓ time the background luminance and is sized such that it would occupy ½ a pixel. We have already shown that the slope of the piecewise linear transfer function that will provide the minimum required contrast given a required signal to noise ration of 10 is given by: Slope $s1=k'1\cdot T=144/L_{knee1}$. This satisfies the equation 33 discussed above. We want the calculate piecewise linear transfer function to yield same (or higher) plate contrast when white-background irradiance increases to L, where $L \geq L_{knee1}$ & $L/3 \leq L_{knee1}$, or equivalently $L_{knee1} \leq L \leq 3 \cdot L_{knee1}$. The slope s1 in region 1 is known from equation 33. The slope S2 in the next region is calculated as:

let $L=a\cdot L_{knee1}$ where $1 \leq a \leq 3$, then $$\Delta 2 = (a \cdot L_{knee1} - L_{knee1}) \cdot s2 = s2 \cdot (a-1) \cdot L_{knee1} \quad (34)$$

$$\Delta 1 = (a \cdot L_{knee1}/3 - L_{knee1}/3) \cdot s1 = s1 \cdot (a-1) \cdot L_{knee1}/3 \quad (35)$$

$$\Delta 2 \geq \Delta 1 \rightarrow s2 \cdot (a-1) \cdot L_{knee1} \geq s1 \cdot (a-1) \cdot L_{knee1}/3 \rightarrow s2 \geq s1/3 \quad (36)$$

Where L=Luminance in the region of interest
$\Delta 1$=contrast in region 1 (known from the requirement of equation 33 and the signal to noise requirement)
$\Delta 2$=contrast in region 2.

If $s2=s1/3$ then $\Delta 2=\Delta 1$ for all L within the interval $L_{knee1} \leq L \leq 3 \cdot L_{knee1}$ that is region 2. The analogous calculation is done for each of the subsequent regions giving the result for the third region $S3=S2/3=S1/9$, in the fourth region $S4=S3/3=S1/27$, and so on. Generally if the ratio of luminance of the background to the luminance of the feature of interest is R, then the slope in the second region is $S2=S1/R$; $S3=S2/R=S1/R^2$, etc. Once the required slope is known for region 1 then the slopes for all of the subsequent regions in the piecewise linear transfer function are known. And once the piecewise linear transfer function is known then the control scheme is known as shown in FIG. 23 where the correspondence between the control scheme 2301 and the piece linear transfer function 2302 is shown and discussed.

An embodiment using at least 5 segments in a piecewise linear transfer function is shown in FIG. 24. The transfer function is shown on the graph of object irradiance that impinges on the sensor along the X-axis 2402 and the resulting senor response output along the Y-axis 2401. The piecewise linear transfer function 2403 guarantees minimum plate contrast across the entire possible range of object irradiances without saturating. The first region 2404 corresponds to the lowest lighting condition. The slope in this region is $S_1$. The value for $S_1$ is determined from the signal to noise requirement, the relative luminance of the background and feature of interest in the image. The relative luminance is determined from the reflective light properties of the material comprising the background and the feature of interest and the relative size of the feature of interest. All as already discussed. The transfer function curve in this first region 2404 intersects the axes at the origin. In another embodiment the intersection of the curve is not quite at the origin as there is a dark current associated with the censor and the dark current produces a reference signal that is subtracted from the data. The subsequent regions 2406-2409 correspond to incrementally increased luminance. The slopes in the subsequent regions that produce the minimum required contrast between the feature of interest and the background are each a fraction of the slope in the first region 2404. In the embodiment shown the slopes in each subsequent region are ⅓ the slope it its neighboring lower luminance region. The value of the slopes Si in each region and the resulting Y-intercept of each of the piece-wise linear segments 2406-2409 determine a voltage reset value and an integration time until the next reset value as shown and discussed in FIG. 23. Although shown using 5 regions, the same procedure is applicable to fewer and larger number of regions. In practice the number of regions is often limited by the imaging system capabilities and the exposure time. In the example of the license plate imaging, The exposure time is typically limited to 500 microseconds to avoid motion blur and the number of voltage resets available within the exposure time is limited by both time and in the case of some imaging systems a built in limit on the number of resets allowed during any exposure period.

Figure 25:
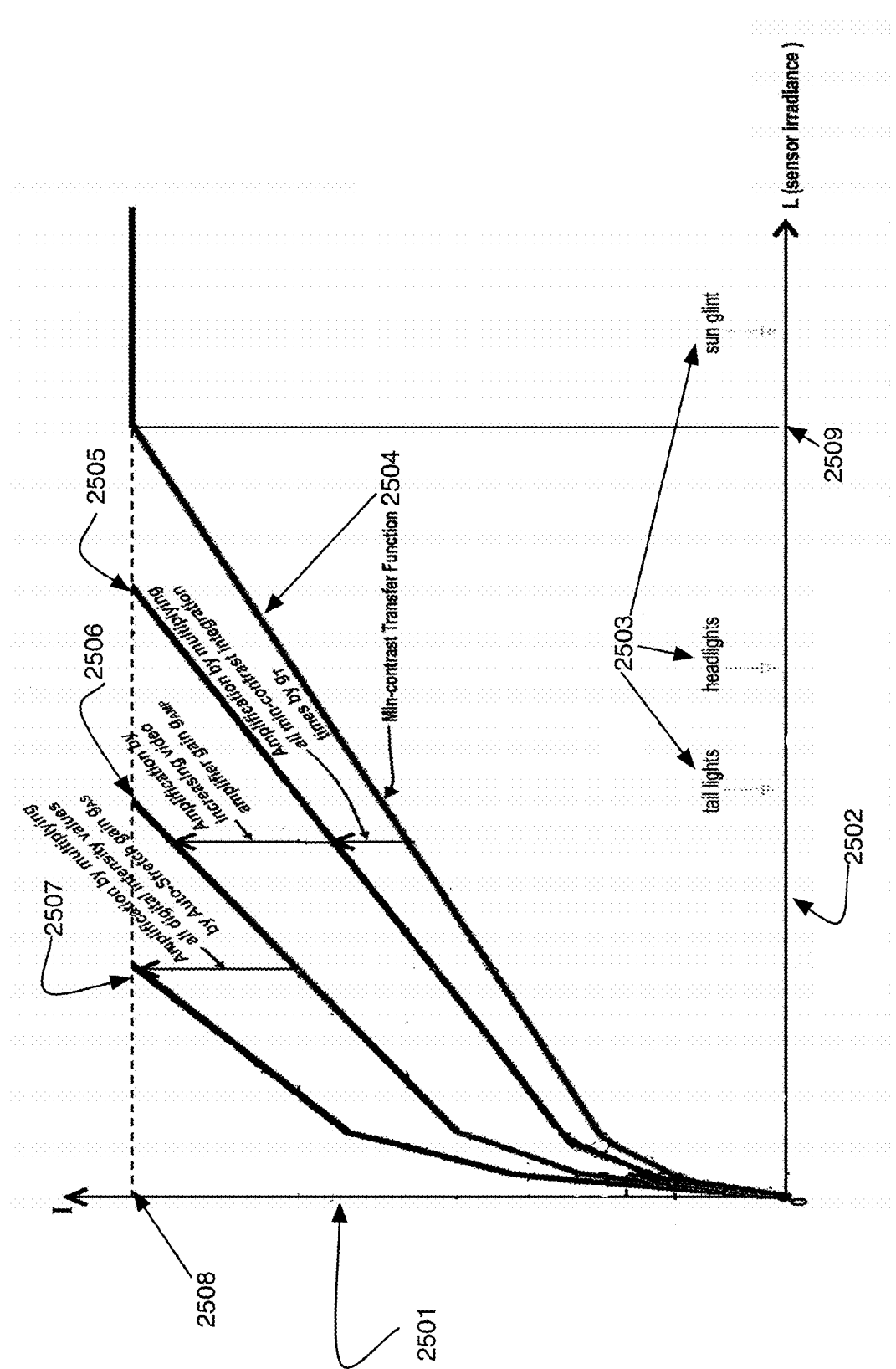
FIG. 25 shows a method for improved contrast under non-retro lighting.

In another embodiment the contrast of the feature of interest is enhanced. If predicted upper limit of plate irradiance is less than a pre-selected maximum, then plate contrast can be amplified beyond the minimum required contrast. Referring to FIG. 25, the now familiar graph of the transfer function is shown. Sensor irradiance is plotted on the X-axis 2502 and the resulting sensor output signal is plotted on the Y-axis 2501. The first curve 2504 is the baseline transfer function that provides the minimum required contrast between the feature of interest and the background. The control parameters for this curve are determined as discussed above. Exposure parameters are selected such that the response curve saturates at the point 2508 which corresponds along the X-Axis 2509 as retro reflection of sunlight from the background onto the sensor. Other luminance points of interest 2503 are also shown to provide a sense of relative intensities. In some instances however the contrast and therefore the signal noise can be improved. In one embodiment in those cases where there is little chance of retro reflection to saturate the sensor controls can be set to improve the contrast. In the first embodiment all of the exposure times are multiplied by a factor Gt thus shifting the curve upward to curve 2505. The curve 2505 will have increased contrast between the feature of interest and the background of the image. The tradeoff in the increased exposure time is increased blur in the image. In another embodiment the contrast is increased by increasing the gain on the video amplifier. The increase in gain will also increase the electronic noise in the system. The gain can therefore only be increased in an amount such that contrast is increased. The increased gain results in the curve 2506. Both increasing the gain and increasing the exposure time require tradeoffs. In another embodiment discussed in FIG. 26, an operating region is determined and the increased gain and increased exposure time are restricted to an operating region that maintains the required contrast performance. In another embodiment the 10 bit output of the A/D of the sensor is mapped to 8 bits and in the process the output is rescaled. In another embodiment the scaling is done so as to amplify the 10 bit signal resulting effectively in the response curve 2507. The amplification has the effect of using more of the bandwidth of the signal from the sensor for the lower luminance regions. In another embodiment the gain and integration time adjustments of FIG. 25 are all used simultaneously. That is the amplifier gain, the auto-stretch "gain" and the integration time are all increased/optimized to maximize the contrast between the feature of interest and the background as seen by the imaging system.

Figure 26:
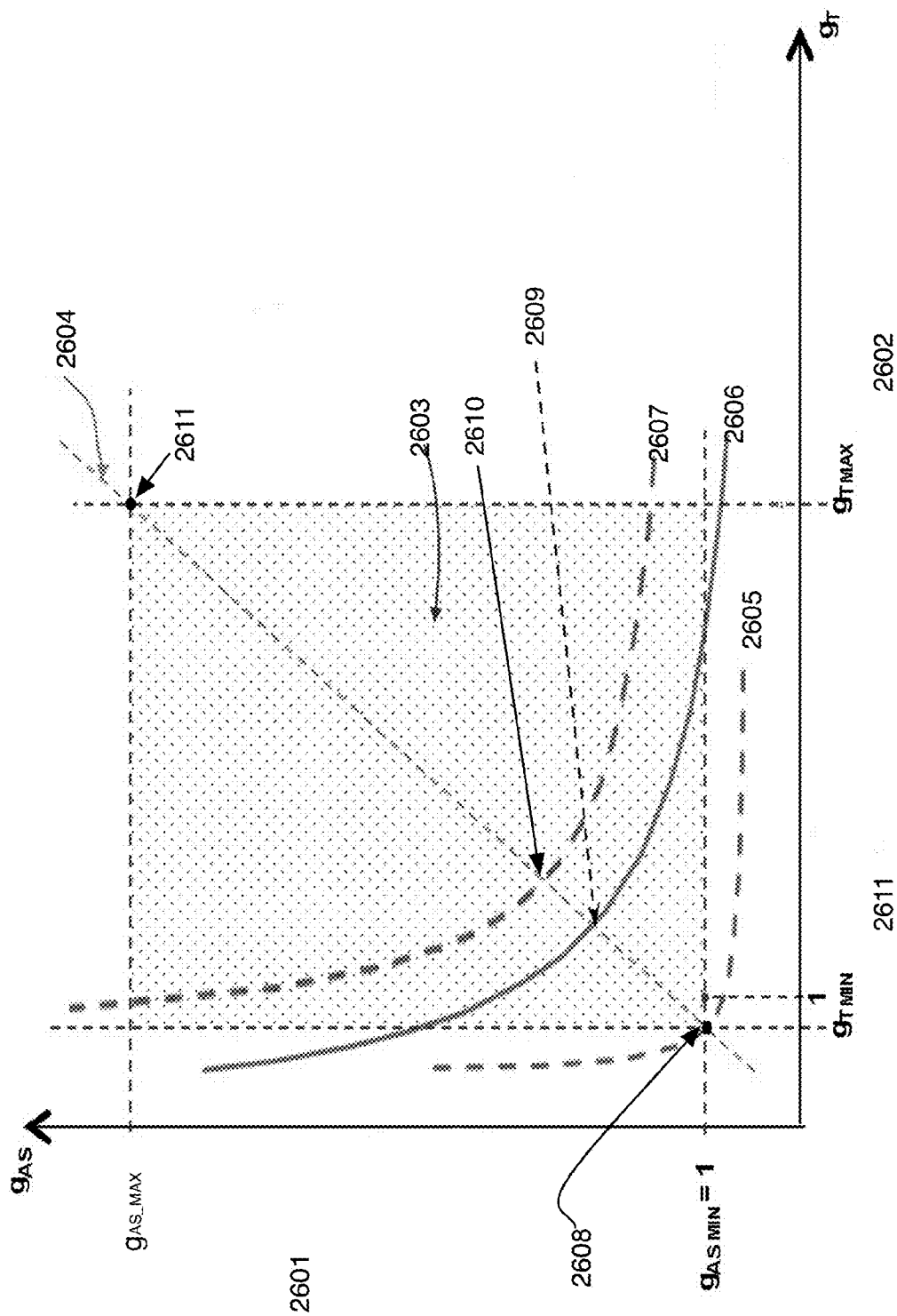
FIG. 26 shows operating range and operating points for exposure time and amplifier gain.

In another embodiment the tradeoff between the gain setting of the imaging system ($g_{AS}$) and the gain through increased integration time ($g_T$) is used to determine a set of optimum gain settings. Referring to FIG. 26, a graph I shown with the electronic gain of the imaging system ($g_{AS}$) plotted along the Y-axis 2601 and the gain through increased integration time when acquiring the image ($g_T$) plotted along the X-axis. The imaging system gain refers to the gain on the amplifier times the autos-stretch gain of going from 10 bit output of the A/D to the 8 bit output of the image. The shaded area 2603 shows the operating range that will maintain the minimum contrast required to recognize a feature on a background given a known signal to noise. The amount of motion blur in image is directly proportional to $g_T$ while amplitude of noise in image is proportional to $g_{AS}$. We want to select $g_T$ and $g_{AS}$ to minimize both motion-blur and noise and at the same time provide the minimum required contrast in the image. The point 2609 is the point of minimum contrast in the image. The total gain is given by $$g = g_T * g_{AS} \quad (37)$$

The amplifier gain has a range determined by the imaging system electronics ranging from $g_{AS\_MIN}=1$, or now increase in gain beyond that of the minimum contrast transfer function to $g_{AS\_MAX}$. Increasing the integration time $g_T$ will increase the contrast between light and dark regions of the image at the expense of increased image blur for moving objects. That is if the object of interest is stationary then increasing the integration time $g_T$ results in increased contrast and increased signal to noise. In one embodiment the inventor has determined that the tradeoff function between in the noise due to noise due to increasing image integration time and therefore blur in the image over the range of possible is given by:

$$g_{AS} = (g_T - g_{T\_MIN}) * (g_{AS\_MAX} - g_{AS\_MIN}) / (g_{T\_MAX} - g_{T\_MIN}) + 1 \quad (38)$$

The graph of the trade-off function is the line 2604 in FIG. 26. There is a linear tradeoff between increased $g_T$ and induced motion and $g_{AS}$ induced image noise. As one goes from the maximum point 2611 to the minimum point 2609 along the line 2604, noise in the contrast measurement is reduced due to reduced motion blur and the noise due to amplifier gain is proportionally reduced for all possible values of $g_{AS}$.

The operating curves 2605-2607 for $g_T$ and $g_{AS}$ using this tradeoff function are given by:

Define s as:

$$s = (g_{AS\_MAX} \cdot g_{AS\_MIN})/(g_{T\_MAX} - g_{T\_MIN}) \tag{39}$$

and substituting into equation (37) gives:

$$g_T = \frac{(s \cdot g_{T\,MIN} - 1) + \sqrt{(1 - s \cdot g_{T\,MIN})^2 + 4 \cdot s \cdot g}}{2 \cdot s} \tag{40}$$

The curves 2605-2607 correspond to the operating equation (40) for the minimum gain 2605 corresponding to the minimum required contrast function, and intermediate gain 2606 which would be used where there is little chance of retro reflection and a maximum gain 2607 corresponding to an operating point for night time use. The operating points 2608-2610 for the system are the intersection of the operating equations for the different gains and the tradeoff function line 2604. That is if it is decided in operating the imaging system that gain can be increased over that of the minimum contrast function as was discussed in connection with FIG. 25 then the operating points for the increased gain required to maintain signal to noise due to both contrast and signal to noise due to image blur are given by the intersection points 2608-2610.

SUMMARY

Figure 27:
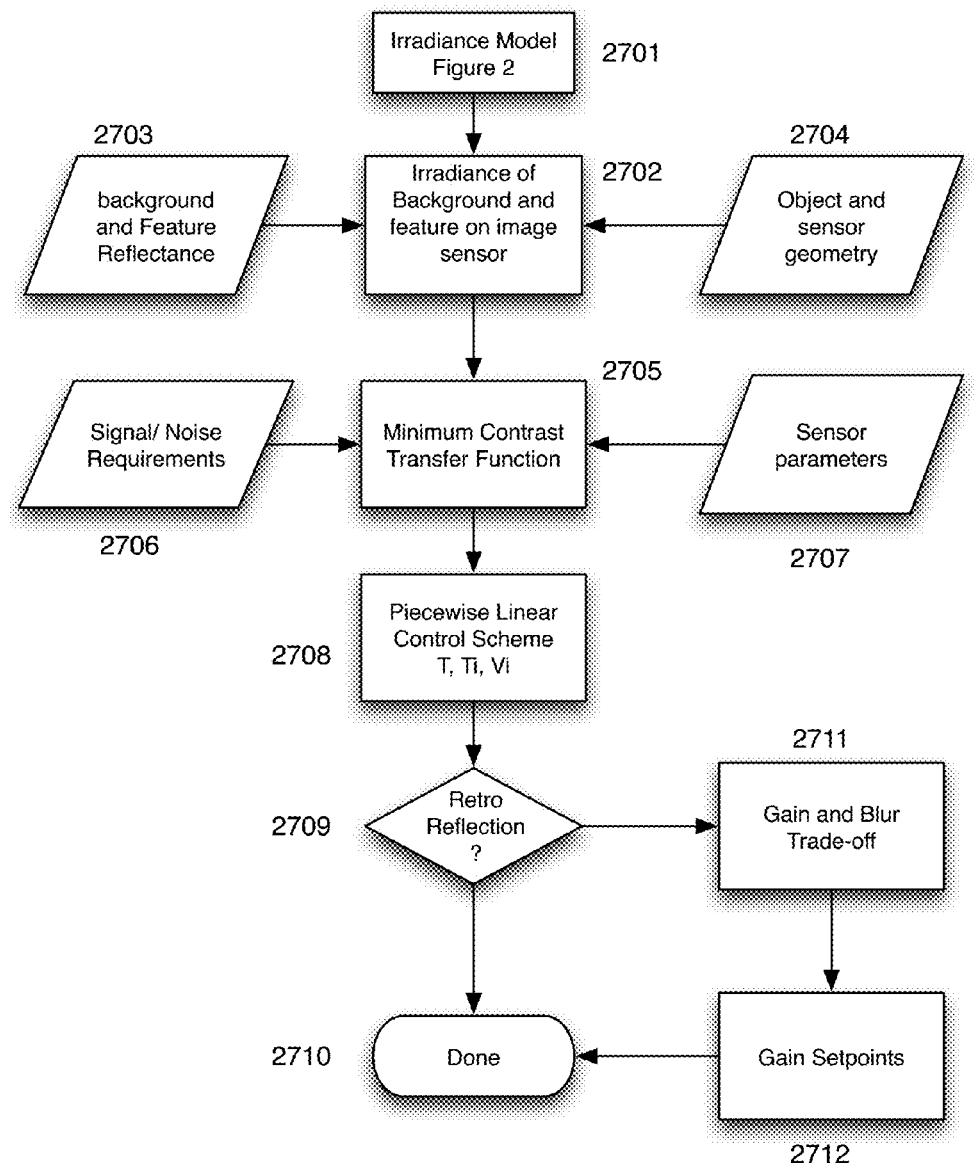
FIG. 27 is a summary flow chart for an embodiment of the invention.

Referring now to FIG. 27 a digital camera control system using the features described is summarized. An irradiance model of the object of interest is calculated as was done in FIG. 2 and the accompanying discussion. In the example the object of interest was a licenses plate but any object whose image is to be acquired by an imaging system can be considered an object of the invention. The object of interest includes a background and a feature to be distinguished from the background. The exemplary object was a license plate on a vehicle moving on a highway through a toll station. The background is the background of the license plate and the feature is a character on the license plate. The irradiance of the background and feature of interest impinging on the image sensor is determined 2702. The input to this determination is the material properties of the object 2703 including the reflectance of the background and the reflectance of the feature of interest. In the example of the license plate the background is white and the feature of interest is the colored state identification feature. In the example the feature of interest had an irradiance of ⅓ that of the background. The additional input is the object and sensor geometry 2704. Object and sensor geometry includes the location of the object relative to the sensor and orientation of both relative to the illumination, nominally the sun or artificial night if setting up for nighttime imaging. Geometry also includes the field of view and the relative pixel size at the field of view for the feature of interest. In the license plate example the field of view required to cover the lane of the road and the number of pixels in the sensor resulted in the feature having a high probability (85% in the example) of covering only ½ of a pixel. A minimum contrast transfer function is then determined 2705. The minimum contrast transfer function for the imaging system is the map of sensor output as a function of luminance from the object impinging on the sensor. The further input is the sensor parameters that are the calibration factors 2707 of the sensor output as a function of known irradiance onto the sensor and the signal to noise requirements 2706 for the feature recognition. In the example of the license plate and character recognition of the state identification feature on the plate the signal to noise requirements were set for both the ability for a human to visually detect the feature of interest on the background and for a machine vision analysis system to automatically recognize characters. The human vision signal to noise requirement in the example was set at the Rose criteria as is known in the art. In other embodiments the signal to noise requirements are determined empirically by imaging known objects and determining the accuracy of recognizing the feature of interest in the known objects. In another embodiment the known objects are a database of known objects. In another embodiment the database is a database of license plate images with known characters. The minimum contrast transfer function is then used to define 2708 a piece linear control scheme for the imaging system during single image acquisition. The piecewise linear control scheme defines a piecewise transfer function that is set to match the minimum contrast transfer function. The control scheme includes the parameters of an integration time for image acquisition, and reset times and paired reset voltages during the image acquisition such that at each reset time, the charge accumulation on individual pixel locations are reset to the paired reference voltages if the actual accumulated charge/voltage for that pixel exceeds the paired reference voltage. The number of reset points during the image acquisition varied from 2 to many. A practical limit is determined by the exposure time and the image sensor electronics. In the example shown a typical exposure time for the license plate was 500 microseconds to limit motion blur and three to five reset points were used during this 500 microsecond exposure. Another embodiment further includes an optional decision point 2709. The piecewise linear transfer function resulting from the control scheme ensures that the minimum contrast requirements are met throughout the range of the very low light through retro reflection of the sun of the background of the object being imaged. This means that a portion of the sensor counts are reserved for very high irradiance. If the geometry, time of day or shading results in a determination that there is little chance for retro reflection then the gain of the system can be adjusted to increase the signal to noise of the system above that of the minimum contrast function. The gain can be increased through a tradeoff of increased exposure time and increased gain on the image sensor. A trade-off function 2711 is used to determine 2712 the optimum operating points with the increased gain and exposure time. If at the decision point it is determined there is a chance for retro reflection then the transfer function and control parameters are used as already determined. The result 2710 is a control scheme for a digital camera system that determines the exposure setting a priori. The exposure setting therefore need not rely on exposure meters or other sensors that may not be available at the speeds required for the image acquisition.

A camera and camera control system for taking a digital image of an object at a geographical location and at a time of day and a date of year is described the object includes a background and a feature. In one embodiment the object is a license plate and the feature is characters on the plate that need to be read. One embodiment includes a camera as described in conjunction with FIG. 1 having an image sensor and image sensor electronics. The sensor includes an array of pixel locations and during a total exposure time of an image acquisition event voltages are accumulated at each pixel location. The camera includes an exposure control system wherein at a plurality of pre-selected reset times during the image acquisition event, each preselected reset time having a corresponding preselected voltage, voltages accumulated at each pixel are reset to the corresponding pre-selected voltage, if the accumulated voltage at the pixel is greater than the corresponding pre-selected voltage. This functionality is shown in FIG. 20 where the relationship between the control system and the transfer function were shown. Also in FIG. 20 the control scheme of Total integration time and the reset times and reset voltages are shown. The camera control system includes a computing device that is programmed to calculate the total exposure time, the pre-selected reset times and the corresponding pre-selected voltages such that the contrast between the feature and the background is greater than a pre-selected multiplier of the level of noise in the digital image. See for example discussion under the heading Minimum Contrast requirements. FIGS. 2-13 and the accompanying discussion describe an embodiment for calculating the irradiance of the background and feature on the image sensor using as inputs a calculated solar irradiance impinging upon the object, the geographical location of the object, a geometrical location, an orientation of the object relative to the camera, a reflectance of the background and of the feature, the time of day and the date of year, the size of the feature, and the field of view of the camera, a measured response of the image sensor to light. All of the imaging exposure control parameters are set prior to imaging the object, and in fact can be set far in advance based upon all of the information listed being available. The exposure setting are determined without use of an exposure meter and are calculated such that the contrast between the feature and the background is greater than the pre-selected multiplier of the level of noise in the digital image for a range of values of luminance that include from darkness to retro-reflection of the sun off the object and onto the image sensor. In another embodiment shown in FIGS. 25-26 the gain on the image sensor electronics is increased if at the time of the image acquisition event there is no retro-reflection of the sun off the object thereby reducing the range of values of luminance over which the system will operate without saturation but increasing the signal for the region of interest. The control scheme results in a stepwise linear transfer function and examples are shown for two, three and more sections. Another embodiment further includes the mapping of the output signal from the 10 bit A/D of the image sensor to an 8 bit signal that is also scaled and removes non-valid pixel data points of the digital image at high luminance and non-valid pixel data points of the digital image at low luminance from the digital image. In one embodiment non-valid pixel data is identified based upon the difference between the voltages for the pixels and pre-selected upper and lower limits. Detailed examples are shown for using the system for recognition of characters on a license plate. But those skilled in the art will see applicability to any imaging situation where a feature needs to be detected on a background.

A digital camera control system that requires no light sensors is described. The control system relies on modeled external environmental geophysical solar parameters, geometric relationships between the object to be imaged and surrounding potentially shadowing objects, the material properties of the object to be imaged such as reflectivity are combined to produce the estimated irradiance on a camera sensor for the particular time of day, date and geometric relationship between the object and the sun. The calculated irradiance on the image sensor for the background of the object of interest and a feature to be recognized provide a contrast. The signal to noise requirements for the feature recognition are used to determine a minimum required contrast transfer function for the sensor and control parameters for the sensor are then determined to meet the minimum contrast requirements. The system enables setting optimized camera settings with no external or internal light sensors. The system therefore provides a method to rapidly determine an optimum camera settings for any time of day and ensures the camera is always ready to capture at least the minimum required contrast image of a fast moving transient object. The system is demonstrated for use in a license plate imaging application.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A camera and camera control system for taking a digital image of an object at a geographical location and at a time of day and a date of year, said object including a background and a feature and said digital image having a level of noise, said system comprising:
   a) the camera having an image sensor and image sensor electronics, said sensor including an array of pixel locations and during a total exposure time of an image acquisition event voltages are accumulated at each pixel location and the camera including an exposure control system wherein at a plurality of pre-selected reset times during the image acquisition event, each preselected reset time having a corresponding preselected voltage, voltages accumulated at each pixel are reset to the corresponding pre-selected voltage, if the accumulated voltage at the pixel is greater than the corresponding pre-selected voltage,
   b) the camera control system connected to the exposure control system and sending control signals to the camera control system, said control signals including the total exposure time and the preselected times and the corresponding preselected voltages, and,
   c) the camera control system including a computing device, said computing device programmed to calculate the total exposure time, the pre-selected reset times and the corresponding pre-selected voltages such that the contrast between the feature and the background is greater than a pre-selected multiplier of the level of noise in the digital image, and,
   d) said calculation is based upon the irradiance of the background and the irradiance of the feature that impinges upon the image sensor at the time of the image acquisition event.

2. The camera and camera control system of claim 1 further including:
   a) the computing device programmed to calculate the irradiance of the background upon the image sensor and the irradiance of the feature upon the image sensor based upon a calculated solar irradiance impinging upon the object, the geographical location of the object, a geometrical location, an orientation of the object relative to the camera, a reflectance of the background and of the feature, the time of day and the date of year, the size of the feature, and the field of view of the camera, a measured response of the image sensor to light, and, b) where the exposure control parameters are set prior to imaging the object, without use of an exposure meter and are calculated such that the contrast between the feature and the background is greater than the preselected multiplier of the level of noise in the digital image for a range of values of luminance that include from darkness to retro-reflection of the sun off the object and onto the image sensor.

3. The camera and camera control system of claim 2 further including programming the computation device to increase a gain on the image sensor electronics if at the time of the image acquisition event there is no retro-reflection of the sun off the object thereby reducing the range of values of luminance.

4. The camera and camera control system of claim 2 wherein the camera and camera control system of claim 1 where the exposure control parameters consist of the integration time, one preselected reset time and one preselected corresponding reset voltage.

5. The camera and camera control system of claim 2 where the exposure control parameters consist of the integration time and two preselected reset times and two preselected corresponding reset voltages.

6. The camera and camera control system of claim 2 where the exposure control parameters consist of the integration time and three preselected reset times and three preselected corresponding reset voltages.

7. The camera and camera control system of claim 1 wherein the computing device is further programmed with a mapping algorithm for the digital image that filters out non-valid pixel data points of the digital image at high luminance and that filters out non-valid pixel data points of the digital image at low luminance from the digital image and scales the digital image, where non-valid pixel data is identified based upon the difference between the voltages for the pixels and pre-selected upper and lower limits.

8. The camera and camera control system of claim 7 where the mapping algorithm maps a ten bit digital image to an eight bit digital image.

9. The camera and camera control system of claim 1 where the camera control system is used for an automated traffic imaging camera and the object is a license plate and the feature is a character on the license plate.

10. The camera and camera control system of claim 1 where the preselected multiplier is based upon the Rose criterion.

11. The camera and camera control system of claim 1 where the preselected multiplier is based upon a measurement of errors in an automated system for recognizing the feature in a database of images of known features.

12. A camera and camera control system for automatically recognizing characters on a license plate of a moving vehicle by acquiring a digital image of the license at a geographical location and at a time of day and a date of year, said license plate including a background and a character and said digital image having a level of noise, said system comprising:

a) the camera having an image sensor and image sensor electronics, said sensor including an array of pixel locations and during a total exposure time of an image acquisition event voltages are accumulated at each pixel location and the camera including an exposure control system wherein at a plurality of pre-selected reset times during the image acquisition event, each preselected reset time having a corresponding preselected voltage, voltages accumulated at each pixel are reset to the corresponding pre-selected voltage, if the accumulated voltage at the pixel is greater than the corresponding pre-selected voltage, b) the camera control system connected to the exposure control system and sending control signals to the camera control system, said control signals including the total exposure time and the preselected times and the corresponding preselected voltages, and, c) the camera control system including a computing device, said computing device programmed to calculate the total exposure time, the pre-selected reset times and the corresponding pre-selected voltages such that the contrast between the character and the background is greater than a pre-selected multiplier of the level of noise in the digital image, and, d) said calculation is based upon the irradiance of the background and the irradiance of the character that impinges upon the image sensor at the time of the image acquisition event.

13. The camera and camera control system of claim 12 further including:

a) the computing device programmed to calculate the irradiance of the background upon the image sensor and the irradiance of the character upon the image sensor based upon a calculated solar irradiance impinging upon the license plate, the geographical location of the license plate, a geometrical location, an orientation of the license plate relative to the camera, a reflectance of the background and of the character, the time of day and the date of year, the size of the character, and the field of view of the camera, a measured response of the image sensor to light, and, b) where the exposure control parameters are set prior to imaging the license plate, without use of an exposure meter and are calculated such that the contrast between the character and the background is greater than the pre-selected multiplier of the level of noise in the digital image for a range of values of luminance that include from darkness to retro-reflection of the sun off the license plate and onto the image sensor.

14. The camera and camera control system of claim 13 further including programming the computation device to increase a gain on the image sensor electronics if at the time of the image acquisition event there is no retro-reflection of the sun off the license plate thereby reducing the range of values of luminance.

15. The camera and camera control system of claim 13 wherein the camera and camera control system of claim 1 where the exposure control parameters consist of the integration time, one preselected reset time and one preselected corresponding reset voltage.

16. The camera and camera control system of claim 13 where the exposure control parameters consist of the integration time and two preselected reset times and two preselected corresponding reset voltages.

17. The camera and camera control system of claim 13 where the exposure control parameters consist of the integration time and three preselected reset times and three preselected corresponding reset voltages.

18. The camera and camera control system of claim 12 wherein the computing device is further programmed with a mapping algorithm for the digital image that filters out non-valid pixel data points of the digital image at high luminance and that filters out non-valid pixel data points of the digital image at low luminance from the digital image and scales the digital image, where non-valid pixel data is identified based upon the difference between the voltages for the pixels and pre-selected upper and lower limits.

19. The camera and camera control system of claim 18 where the mapping algorithm maps a ten bit digital image to an eight bit digital image.

20. The camera and camera control system of claim 12 where the preselected multiplier is based upon the Rose criterion.

21. The camera and camera control system of claim 12 where the preselected multiplier is based upon a measurement of errors in recognizing the characters in a database of license plate images.

22. A method of identifying a feature on an object said method comprising:
   a) acquiring a digital image of the object in an image acquisition event, using a camera and camera control system, said image acquired at a geographical location and at a time of day and a date of year, said digital image having a level of noise, the camera having an image sensor and image sensor electronics, said sensor including an array of pixel locations, and,
   b) during a total exposure time of an image acquisition as event voltages are accumulated at each pixel location and at a plurality of pre-selected reset times during the image acquisition event, each preselected reset time having a corresponding preselected voltage, resetting voltages accumulated at each pixel to the corresponding pre-selected voltage, if the accumulated voltage at the pixel is greater than the corresponding pre-selected voltage,
   c) calculating the total exposure time, the pre-selected reset times and the corresponding pre-selected voltages such that the contrast between the feature and the background is greater than a pre-selected multiplier of the level of noise in the digital image, and,
   d) said calculating is based upon an irradiance of the background and an irradiance of the feature that impinges upon the image sensor at the time of the image acquisition event.

23. The method of claim 22 wherein the irradiance of the background upon the image sensor and the irradiance of the feature upon the image sensor are calculated based upon a calculated solar irradiance impinging upon the object, the geographical location of the object, a geometrical location, an orientation of the object relative to the camera, a reflectance of the background and of the feature, the time of day and the date of year, the size of the feature, and the field of view of the camera, a measured response of the image sensor to light, and,
   a) where the calculating is done prior to imaging the object, without use of an exposure meter and such that the contrast between the feature and the background in the digital image is greater than the pre-selected multiplier of the level of noise in the digital image for a range of values of luminance that include from darkness to retro-reflection of the sun off the object and onto the image sensor.

24. The method of claim 23 further including increasing a gain on the image sensor electronics if at the time of the image acquisition event the calculating indicates that there is no retro-reflection of the sun off the object thereby reducing the range of values of luminance.

25. The method of claim 22 where the camera control system is used for an automated traffic imaging camera and the object is a license plate and the feature is a character on the license plate.

26. The method of claim 22 where the preselected multiplier is based upon the Rose criterion.

27. The method of claim 22 where the preselected multiplier is based upon a measurement of errors in an automated system for recognizing the feature in a database of images of objects with known features.

* * * * *